United States Patent [19]

Goto et al.

[11] Patent Number: 5,075,866
[45] Date of Patent: Dec. 24, 1991

[54] APPARATUS FOR AUTOMATICALLY DESIGNING JIG

[75] Inventors: Sunao Goto; Masaru Kawano, both of Higashihiroshima, Japan

[73] Assignee: Mazda Motor Corporation, Hiroshima, Japan

[21] Appl. No.: 426,875

[22] Filed: Oct. 25, 1989

[30] Foreign Application Priority Data

Oct. 26, 1988 [JP] Japan ................. 63-268327

[51] Int. Cl.$^5$ ............................................. G06F 15/46
[52] U.S. Cl. ................... 364/474.24; 364/468; 364/474.20; 364/474.21
[58] Field of Search ............. 364/474.24, 468, 474.20, 364/474.21, 474.25

[56] References Cited

U.S. PATENT DOCUMENTS

| | | | |
|---|---|---|---|
| 4,530,046 | 7/1985 | Kariya | 364/191 |
| 4,547,854 | 10/1985 | Hashimoto et al. | 364/474.21 X |
| 4,549,270 | 10/1985 | Fukumura et al. | 364/474.21 |
| 4,618,924 | 10/1986 | Hinds | 364/474.25 X |
| 4,641,270 | 2/1987 | Lalloz et al. | 364/468 X |
| 4,656,590 | 4/1987 | Ace | 364/474.25 X |
| 4,739,488 | 4/1988 | Asakura | 364/474.21 |
| 4,918,627 | 4/1990 | Garcia et al. | 364/474.24 X |
| 4,936,862 | 6/1990 | Walker et al. | 364/468 X |
| 4,937,768 | 6/1990 | Carver et al. | 364/191 X |

FOREIGN PATENT DOCUMENTS 62-137129 6/1987 Japan .

OTHER PUBLICATIONS

Article, *Journal of Manufacturing Systems*, vol. 7, No. 2 entitled "Principles for Part Setup and Workholding in Automated Manufacturing".

*Primary Examiner*—Jerry Smith
*Assistant Examiner*—Allen M. Lo
*Attorney, Agent, or Firm*—Price, Heneveld, Cooper, DeWitt & Litton

[57] ABSTRACT

The present invention discloses an apparatus and a method for automatically designing a jig comprising at least one part. In this apparatus and method, the kind of a jig and the kind of a workpiece to be worked on are first specified, a basic linkage mode which basically shows a linkage between the parts of the specified jig is then searched for, and structural models of the parts forming the jig are successively generated by using at a starting point data with respect to a position of the workpiece to be worked on by the jig on the basis of the basic linkage model searched for.

8 Claims, 30 Drawing Sheets

| No. | PART NAME | DECISION CONDITION | DIMENSION DECIDING METHOD | TYPE |
|---|---|---|---|---|
| 1 | BASIC LINKAGE MODEL | RECEIVING SURFACE, POSITION PATTERN, CLAMPING FORCE, CLEARANCE IN UN-CLAMPING | DECISION BY INTERNAL CALCULATION AND EVALUATION FUNCTION | MATHEMATICAL MODEL |
| 2 | STAND | TYPE, BASIC HEIGHT, BASIC WIDTH | SEARCH FROM DIMENSIONAL TABLE | TABLE |
| 3 | CYLINDER | REQUIRED STROKE, PISTON DIAMETER (CLAMPING FORCE) | SEARCH FORM DIMENSIONAL TABLE | TABLE |
| 4 | CLAMP ARM | FULCRUM POSITION, CLAMPING SURFACE SHAPE, TYPE | INTERNAL CALCULATION | MATHEMATICAL MODEL |

FIG. 6A

| No. | PART NAME | DECISION CONDITION | DIMENSION DECIDING METHOD | TYPE |
|---|---|---|---|---|
| 5 | RECEIVING PLATE (LOCATOR) | RECEIVING SURFACE, BED SURFACE, MOUNTING HOLE, LINK FULCRUM POSITION, TYPE | DIAMETER OF LINK FULCRUM, AXIAL LENGTH | MATHEMATICAL MODEL |
| 6 | BED | WORK OUTLINE UNIT CONFIGURATION | INTERNAL CALCULATION | MATHEMATICAL MODEL |
| 7 | CYLINDER BRACKET | CYLINDER FULCRUM POSITION, RECEIVING PLATE SHAPE, CYLINDER SHAPE | INTERNAL CALCULATION | MATHEMATICAL MODEL |
| 8 | ACCESSORY PIN WASHER SCREW | DIAMETER OF LINK FULCRUM, AXIAL LENGTH | SEARCH FROM DIMENSIONAL TABLE | TABLE |

FIG. 6B

| PATTERN | 1 | 2 | 3 | 4 |
|---|---|---|---|---|
| SHAPE PROCESSING | (shape diagram with A, B, R1, R2, S1, S2) | (shape diagram with A, B, R1, R2, S1, S2) | (shape diagram with A, B, R1, R2, S1, S2) | (shape diagram with A, B, R1, R2, S1, S2) |
| LOGICAL DECISION | $x_1 < X_1$<br>$x_2 < X_2$ | $x_1 \geqq X_1$<br>$x_2 < X_2$ | $x_1 \geqq X_1$<br>$x_2 \geqq X_2$ | $x_1 < X_1$<br>$x_2 \geqq X_2$ |

FIG. 11

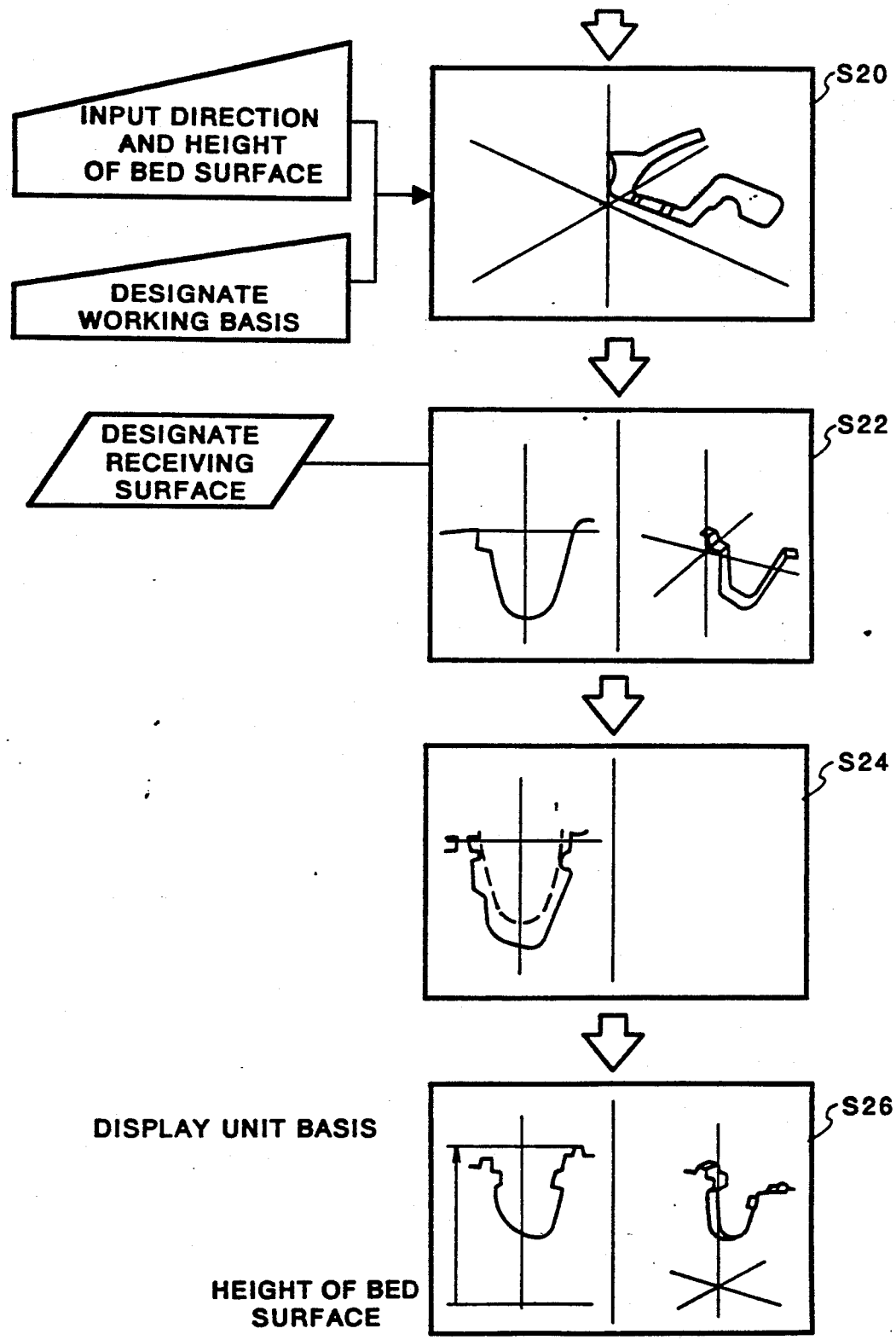
F I G. 13A

| WORK MASTER DATABASE (WDB) | | | |
|---|---|---|---|
| POSITION CODE | BASIC WORKING POINT | SHAPE DATA FOR BASIC WORKING POSITION | WORK SHAPE DATA |
| $K_1$ | | | |
| $K_2$ | ----- | ----- | ----- |
| $K_3$ | | | |
| .......... | | | |

FIG. 15A

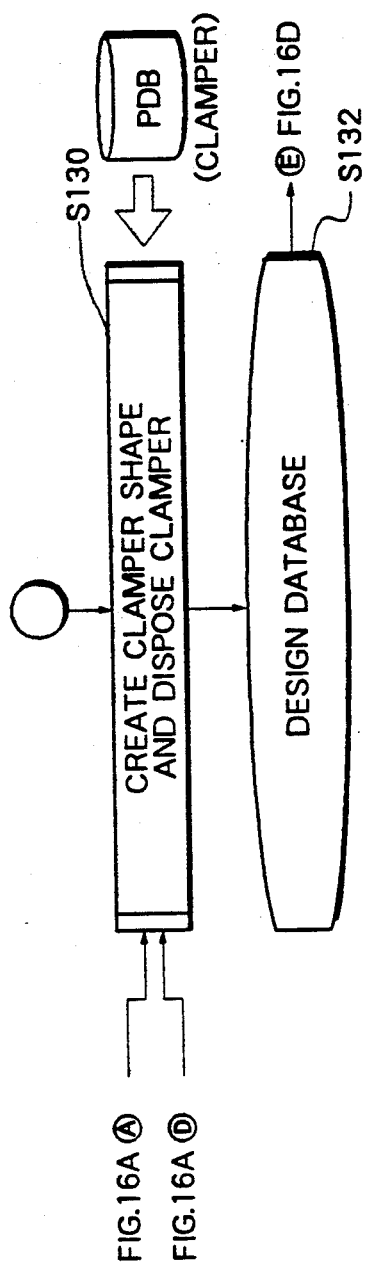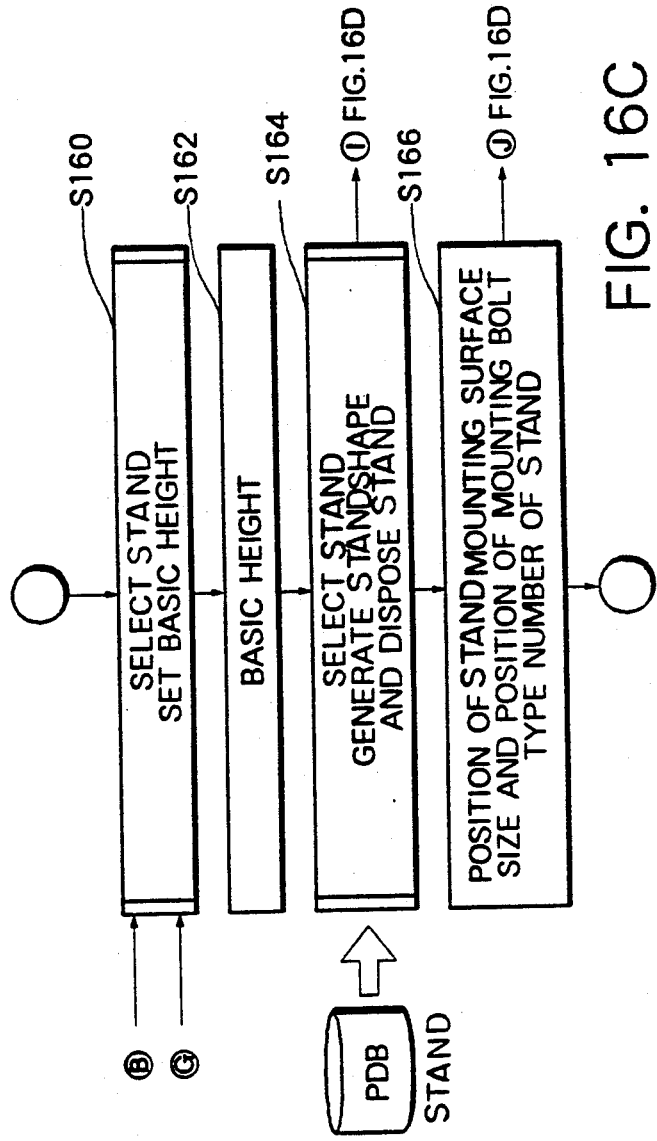

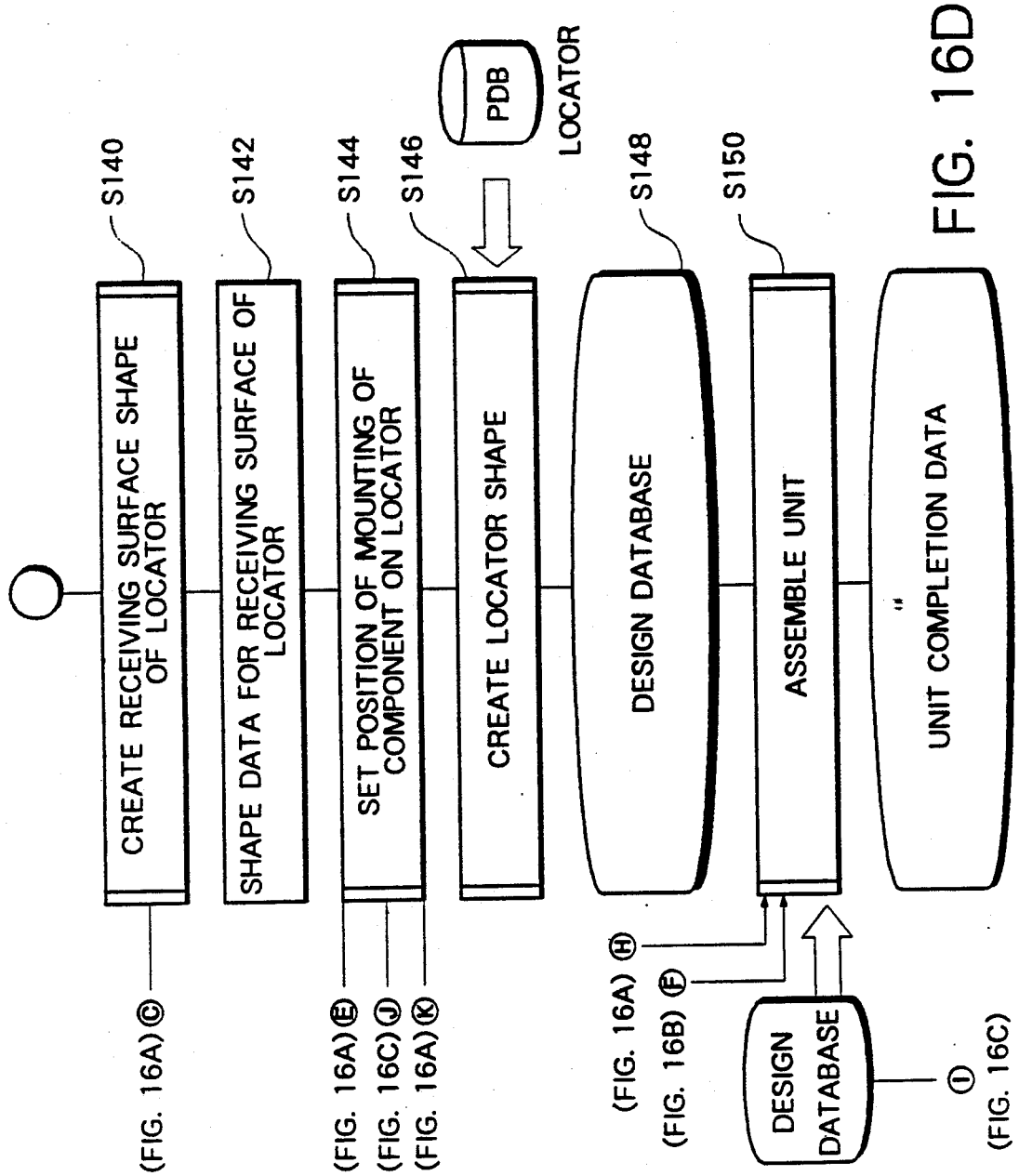

APPARATUS FOR AUTOMATICALLY DESIGNING JIG

BACKGROUND OF THE INVENTION

The present invention relates to a design apparatus for automatically designing a jig comprising a plurality of components. Such a jig is used for clamping and guiding the work of welding, assembling, clamping, cutting or the like or tools therefor. This design apparatus is related to an automatic design apparatus which employs a computer system or the like, i.e., CAD/-CAM. The components which form the jig include parts which are commercially available and widely used and special parts which can be exclusively used in the jig.

When a jig comprising a plurality of components is designed, conventional design support systems called CAD/CAM generally use the following design methods:

When a workpiece to be designed comprises a plurality of parts, the graphic data base for each of the parts substantially corresponds to the actual shape of each part. For example, when a part is basically characterized by length×width×height ratio, the graphic data thereof has the same length×width×height ratio. In the graphic data base are previously registered the graphic data for each of the parts and graphic data for the sam parts in various configurations. The graphic form displayed is therefore equivalent to the graphic data of the part designated even if a part to be selected and the configuration of the same part to be selected are designated by the operator or by using a program. In other words, graphic forms other than the graphic forms stored in the graphic data base are never displayed.

For example, Japanese Patent Laid.Open No. 63-137219 discloses a technique for automatically designing a mold, but the above.described fact also applies to this technique of this Japanese Patent Laid-Open with respect to the graphic forms displayed in the system of this prior art.

However, parts having any forms cannot be designed by CAD/CAM, and the part designed must always satisfy certain given conditions. For example, when a jig is automatically designed, a jig having any desired forms cannot be designed. The jig designed should be limited by the type of workpiece for which the jig is used and the position and the form of the surface which contacts with the jig. In addition, since a jig is always moved and contains a movable portion, the jig must not interfere with other portions of the workpiece. When a jig is designed, therefore, consideration must be given to not only the contact surface but also the general form of the workpiece. Namely, it is necessary to strictly limit the conditions for designing only one jig. Further, jigs which do not satisfy these strictly limited conditions are useless as jigs.

The above.described conventional CAD/CAM is, however, designed so that the operator or programmer can draw lines or select the parts registered in an interactive manner, as described above. The system has only the function to draw lines in accordance with the designation from the operator or extract from the data base the graphic data directly corresponding to the registered part selected and display it. When a jig which does not satisfy the limited conditions is consequently designed, therefore, the operator is placed in a situation in which the work of designing must be started all over again for the purpose of designing a useful jig.

This causes an increase in the time required for designing and is thus significantly inefficient. If an attempt is made to reduce the time for designing, the operator or the programmer must imagine the graphic form displayed to some extent before giving instructions to draw lines or instructions to select a part, elaborate on the instructions and the selection by controlling and selecting in one's head and endeavor as much as possible to designate an accurate part form. However, since there are various kinds of limits, it is extremely difficult to imagine the graphic form of the whole of the part on the assumption of these limited conditions. This finally leads to a reduction in the efficiency of the work.

SUMMARY OF THE INVENTION

Accordingly, the present invention has been proposed as a conception which is fundamentally different from the prior art with a view to removing the above.-described problem of conventional apparatuses. It is an object of the present invention to provide an apparatus for automatically designing a jig by designing structural models which accurately show the structure of the intended jig assuming the most basic starting conditions for design with respect to a portion to be processed on a workpiece and a basic linkage model which shows the configuration of parts of the jig.

In order to achieve this object, the present invention provides an apparatus for automatically designing a jig comprising one or more parts, the apparatus comprising a linkage model generating means for generating a basic linkage model which basically shows the linkage between the one or more parts; and structural model generating means for successively generating the structural models of the parts, which form the jig, by using as the starting point the data with respect to a portion of a workpiece to be worked on by the jig in accordance with the basic linkage model.

The method of the present invention for achieving the above object is a method for automatically designing a jig comprising one or more parts, comprising the steps of designating the kind of a jig and a workpiece, retrieving a basic linkage model which basically shows the linkage between the parts of the jig designated on the basis of the kind of the jug and the workpiece to be worked on, and successively generating a structural model of the parts which form the jig by using as a starting point the data with respect to a portion of the workpiece to be worked on in accordance with the basis linkage model retrieved.

The above-described apparatus and method enable automatic design of a structural model, which shows the precise structure of the jig, assuming the most basic design starting conditions with respect to a portion of the workpiece and the basic linkage model roughly showing the configuration of the parts of the jig.

The present invention further comprises storage means in which a plurality of basic linkage models are previously stored, setting means for setting allowable conditions for designing the jig, comparison means for comparing the structural model of the parts generated by the structural model generating means with the allowable conditions, and means for retrieving other basic linkage models from the storage means. Namely, if the first basic linkage model does not satisfy the allowable design conditions, other basic linkage models are successively retrieved so that the structural model is designed over again in accordance with the model retrieved. This enables more precise designing.

In one aspect of the present invention, the jig comprises movable components and non.movable components, and the structural model generating means first starts the designing of the movable part.

In one aspect of the present invention, the linkage model generating means has the function of storing as a data base the data with respect to the portion of the workpiece to be worked on by the jig for each work.

In one aspect of the present invention, a basic linkage model is prepared for every pair of each kind of jig and the workpiece.

DESCRIPTION OF THE DRAWINGS

FIGS. 6A and 6B are drawings in which information with respect to the parts used in the clamp unit is summarized in a table;

FIG. 11 is an explanatory view of design conditions for creating the form of a locator;

FIGS. 13A to 13E are flow charts which show the operating procedure of the system shown in FIGS. 3A and 3B;

FIGS. 14 and 15A to 15F are drawings of the data structure of each of the data bases used in the system shown in FIGS. 3A and 3B;

FIGS. 16A to 16D are flow charts of the processing procedure for designing the unit shown in FIG. 4;

DESCRIPTION OF THE PREFERRED EMBODIMENTS

An embodiment in which the present invention is applied to a CAD system for automatically designing jigs used in a car body assembly line for assembling parts to form a finished product is described below with reference to the attached drawings. The jigs are used for clamping the parts of a car in an assembly line.

PRINCIPEL OF THE EMBODIMENT

Figure 1:
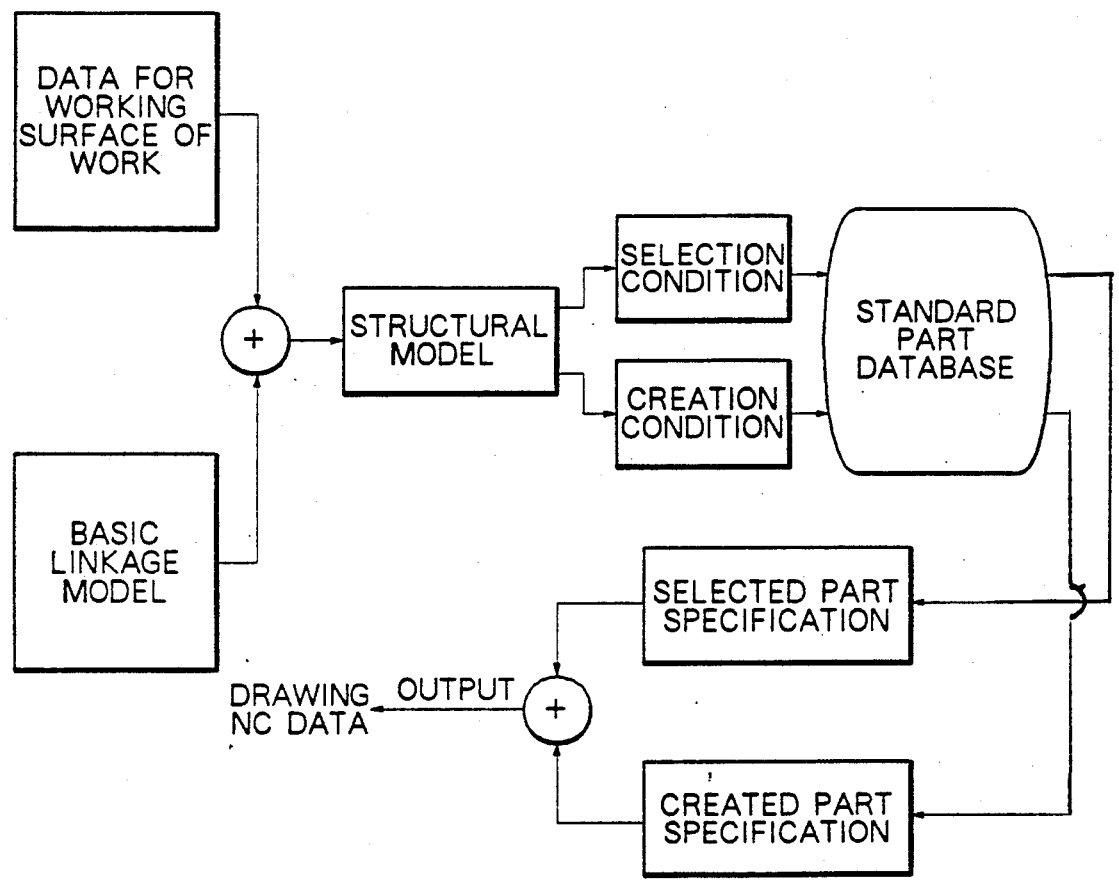
FIGS. 1 and 2 are explanatory views of the configuration concept of an embodiment of the present invention.
Figure 2:
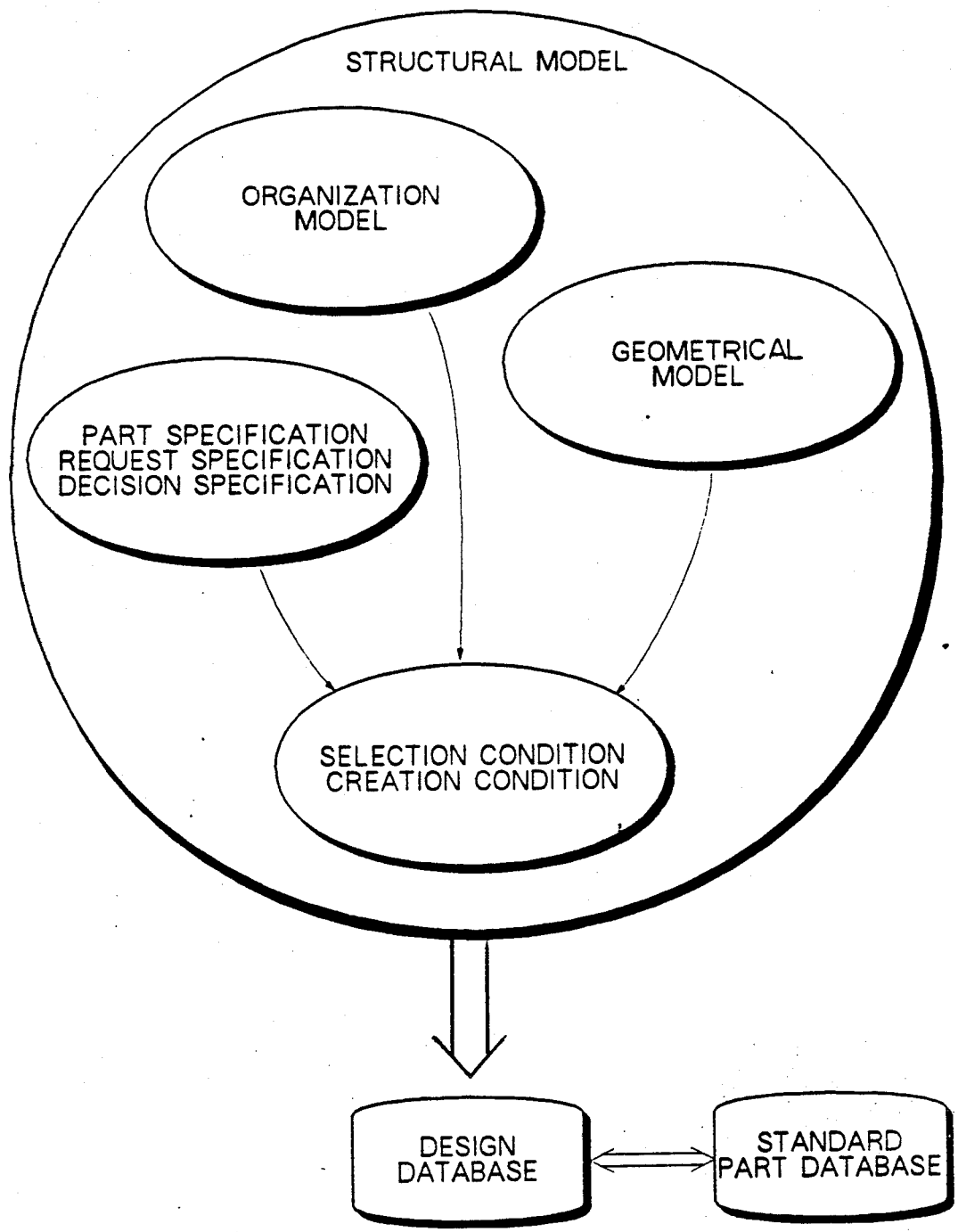

FIGS. 1 and 2 show the concept of a CAD system in this embodiment. In this CAD system, the basic data with respect to a surface on which a workpiece is worked on and the basic linkage model are used at the staring point. Although the basic data and the basic linkage model are described in detail below, the basic data include at least data with respect to a portion of a workpiece to be worked on, and the basic linkage model is a formula model (called "organization model") which expresses the mechanical relationships between the components which form the jig and which comprises a movable portion and a non.movable portion or a formula model (called "geometrical model") which expresses the geometrical relationship between the components. The geometrical model shows the configuration relationship between the respective parts and "a gap" (clearance) from the form of a workpiece and the like.

A structural model of the parts is generated from the basic data and the basic linkage model. The structural model is a set of "specifications" (the idea of "part specification") which is designed from the basic data and the basic linkage model for specifying the jig unit to be designed, and corresponds to the unit 1 to 1. When the specification of one part of the unit is determined, this specification becomes a design condition for another part. The specification determined of another part is consequently determined and becomes a design condition for a still another part. In this way, the unit structures are successively materialized in a linking manner. "A design data base" is used as a storage location for concrete data used in designing. As shown in FIG. 2, if the existing standard parts are present in the system, "the part specification" corresponds to "selection conditions" for selecting a desired part from the standard parts. If the desired part is absent from the standard parts, a specification ("creation specification") for creating a form similar to the part specification on the basis of the part specification is selected. The input and output between the respective data bases are performed through a unit structure record (FIG. 14) in the design data base.

The system for designing a jig has the following characteristics:

(1): Since "the structural model" is generated as "a set of part specification concepts" which can be easily grasped by humans, automatic design can be easily realized. In conventional CAD systems, since a design simply comprises a collection of diagrams, if an incomplete diagram is displayed in a step during the course of designing a human cannot easily grasp whether or not the incomplete diagram is appropriate.

(2): In this system for designing a jig, since the standard parts are selected in connection with the structural model formed as "a set of part specification concepts", the number of the forms of jigs which must be formed by the instructions to draw a diagram given by the operator is the minimum required value.

(3): The contact surface of a jig is formed directly on the basis of the worked on workpiece's surface data, and thus the precision of the work is significantly improved.

SUMMARY OF EMBODIMENT SYSTEM

Figure 3A:
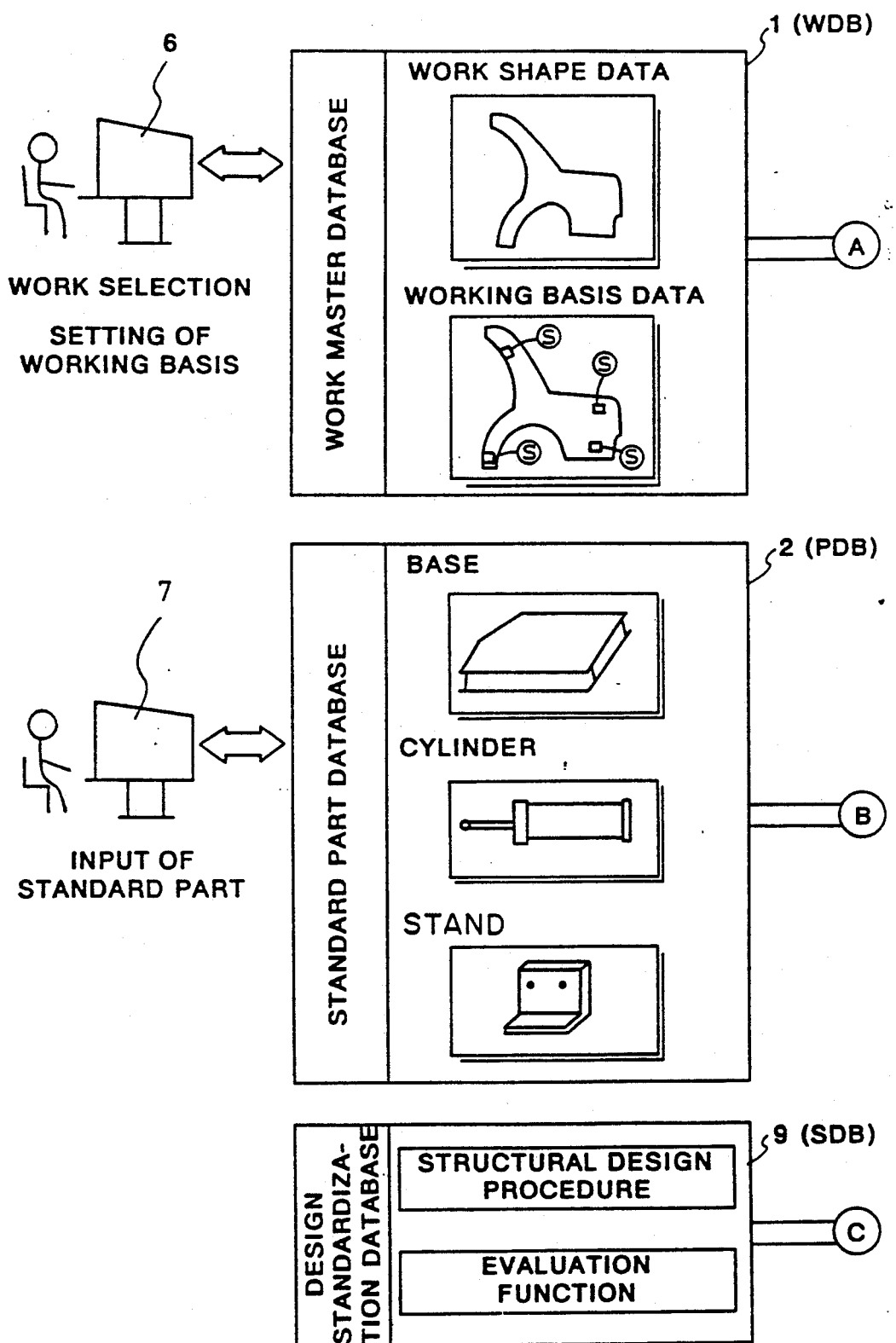
FIGS. 3A and 3B are drawings of the system structure of an embodiment to which the present invention is applied.
Figure 3B:
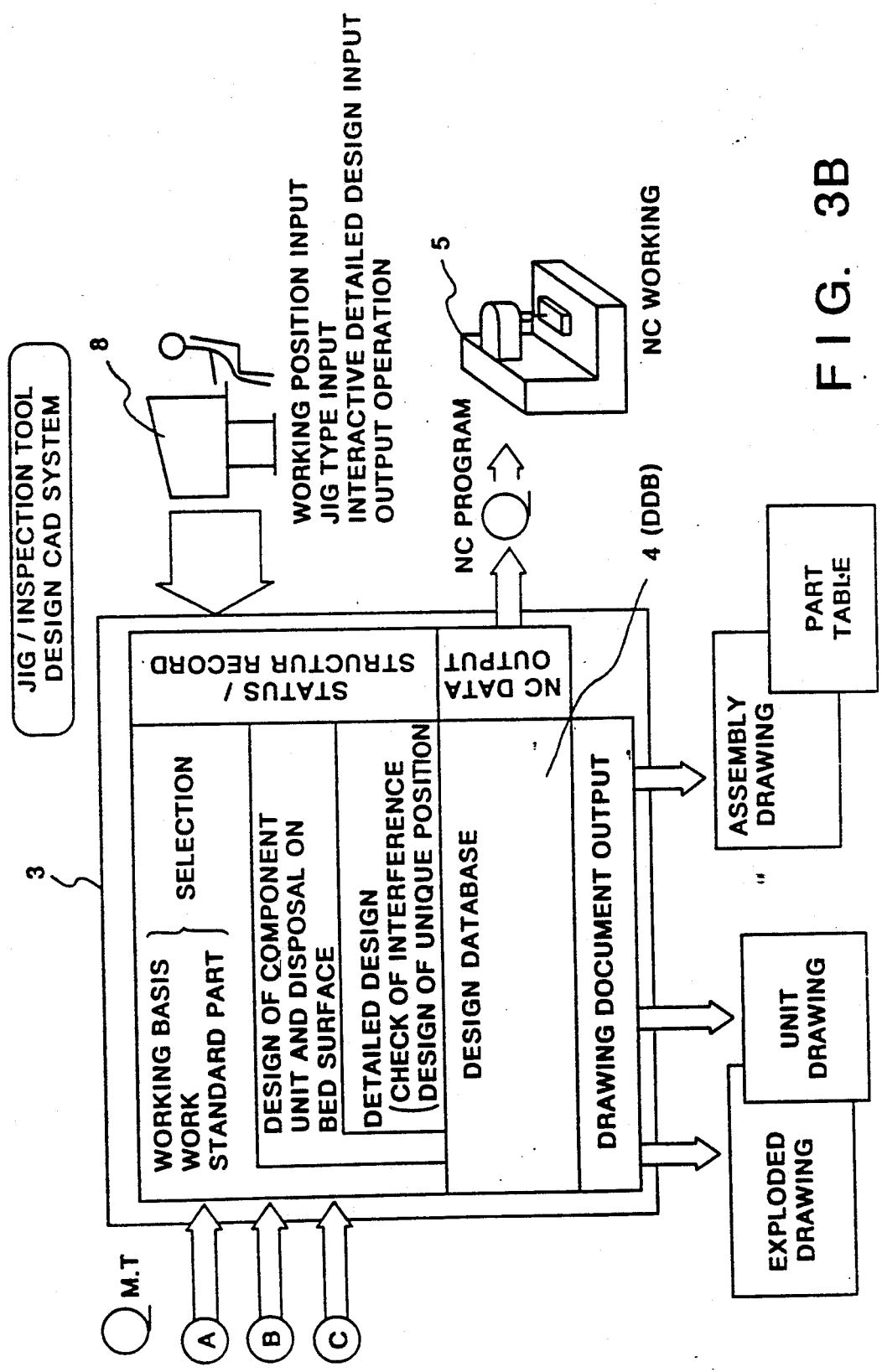

FIGS. 3A and 3B are drawings of the whole of a CAD system in an embodiment. This CAD system is designed first for reducing the number of steps required for designing a jig, secondly for improving the precision of the NC work and thirdly for promoting standardization. For these purposes, the concept of automatic design in the system is the following:

the design prooedure and pattern are programmed,
the standard parts are programmed. on conditions and creation the design items (selection conditions and creation conditions) are automatically calculated in accordance with the input of design conditions, p1 the standard part is retrieved and disposed in accordance with the selection conditions, the form of a part is automatically created (output of the creation conditions), two-dimensional diagrams are formed directly from three-dimensional data, and NC data is generated directly from three-dimensional data.

Although the above described concept will be made clear by reading the below description, the configuration of the CAD system is described below with reference to FIGS. 3A and 3B. In the CAD system, three input databases and a single output database are used. The three input databases comprise "a work master database (WDB)" 1 containing data with respect to a workpiece to be worked on by the jig, "a standard part database (PDB)" 2 containing data with respect to the standard parts used when the jig is formed by the standard parts, and "a design standardization database (SDB)" containing the basic linkage model or the like in which the relationship between the jig components forming the jig and the mechanisms thereof or the relationship between the components and the geometry thereof are stored as a formula model. The above-described output database is "a design database" 4.

WDB 1 mainly comprises "work shape data" with respect to the form of a workpiece and "working basis data" which shows a position of the workpiece to be worked on by the jig. The three input databases which are previously formed are stored in a host system 3. When a jig is designed, the operator inputs the kind of a workpiece, a position of the workpiece to be worked on (working basis data), the selection of a linkage model and the like through a work station 8. On the assumption of these items input, the host system 3 performs detailed design in a manner of conversation with the operator. At the same time, the system 3 serves to search SDB and WDB on the basis of the basic linkage model and the working position of the workpiece, which are selected and input, as shown in FIGS. 3A and 3B, to form "a structural model" from "the basic linkage model". When the structural model is formed, incongruence such as interference between the structural model showing the jig and the workpiece is examined by using "the work shape data". If there is interference, a unique portion is designed over again so that no interference takes place. The selection conditions and the creation conditions are output on the basis of the thus-designed structural model. The standard part having a specification which agrees with the jig is searched for in the standard part database in accordance with the output selection conditions and is then output to the design database. The design part is also designed in accordance with the creation conditions and output to the design database. NC data is output from the design database together with the exploded drawing of the jig, the unit drawing, the assembly drawing and the part table and so on, as occasion demands.

JIG TO BE DESIGNED

Figure 4:
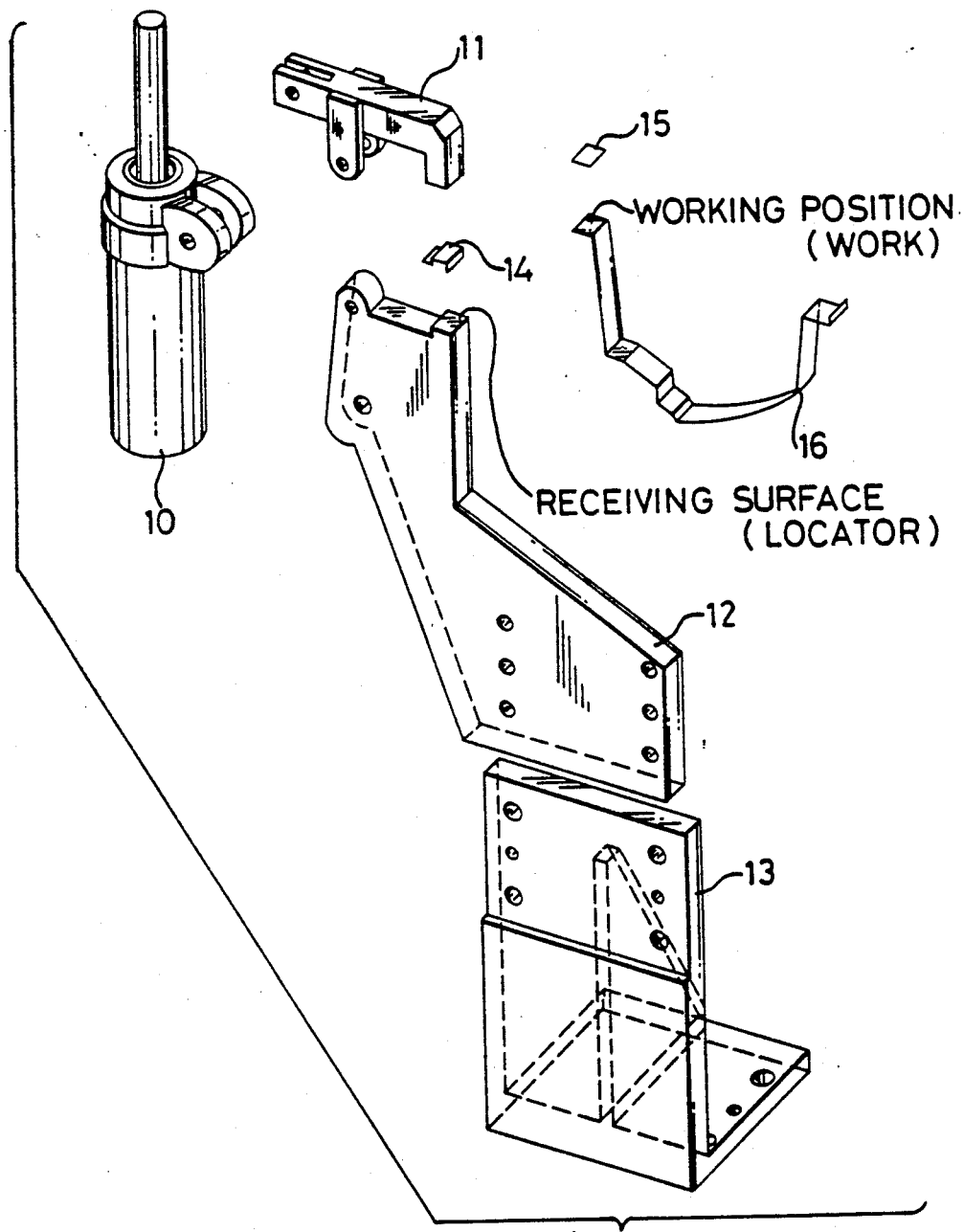
FIG. 4 is a perspective exploded view of a clamp unit as an example of a jig which is designed by the system shown in FIGS. 3A and 3B.

The system shown in FIGS. 3A and 3B is capable of automatically designing various jigs for various workpiecse in correspondence with the kind of work. FIG. 4 is an exploded perspective view of an example of a jig designed by the system.

The jig is used for clamping a thin steel plate portion 16 of a workpiece and mainly comprises components such as a cylinder 10, a clamp arm 11, a locator (receiving plate) 12 ad an stand 13. Reference numeral 15 denotes the form of a basic working portion of the workpiece 16, and reference numeral 14 denotes the form of ar eceiving surface of the locator 12 which contacts with the basic working portion.1

Figure 5:
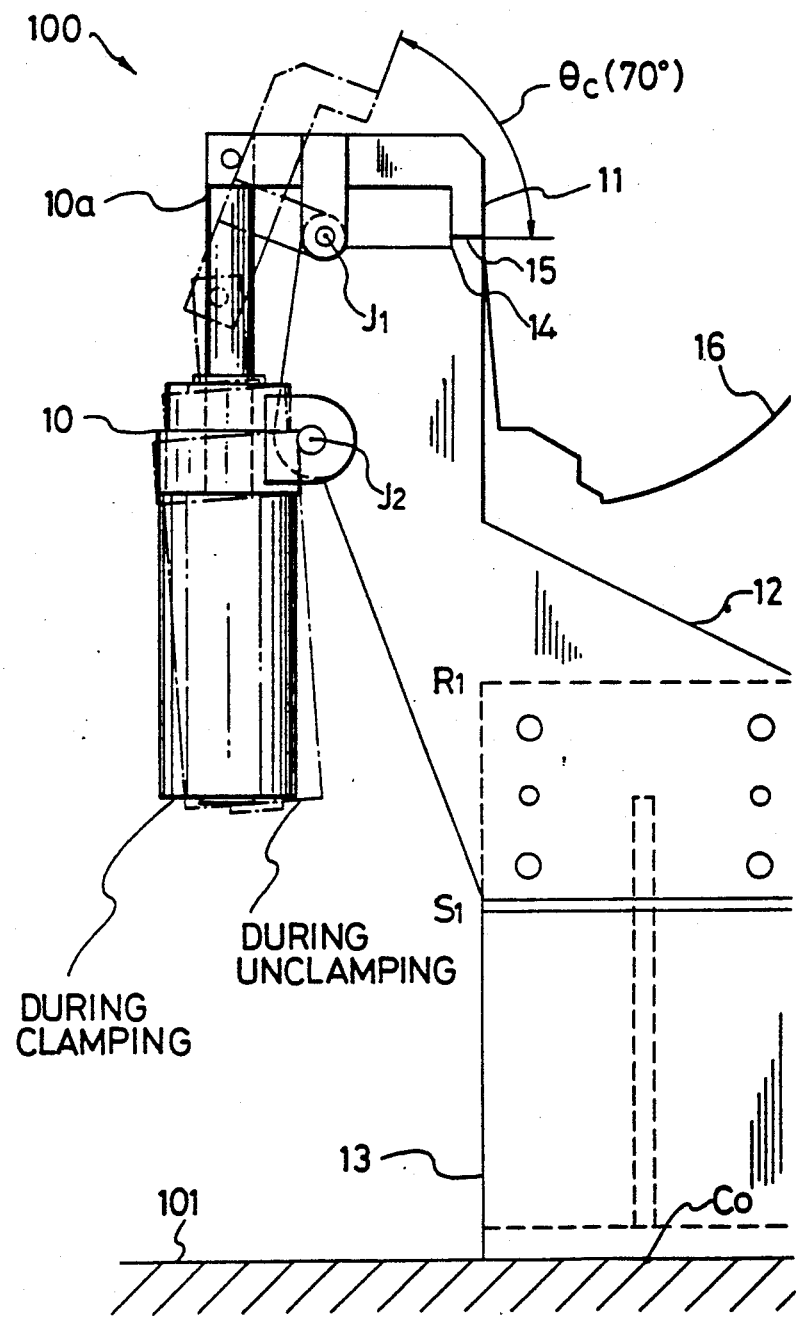
FIG. 5 is a front view of the clamp unit.

FIG. 5 is a front view of the jig which holds the workpiece 16 in a state wherein the jig is assembled and fixed on a bed 101. The jig 100 is used for receiving the workpiece 16 and is thus called "a cradle unit" hereinafter.

In order to cause the cradle unit 100 to hold the workpiece 16 and clamp it, it is necessary to rotate the clamp arm 11 around a clamping fulcrum $J_1$. In this jig unit 100, the rotation of the clamp arm 11 is achieved by changing the piston movement of the cylinder 10. In other words, the end of the rod 10a of the cylinder 10 is rotatably supported by the end of the clamp arm 11. The clamp arm 11 is rotatably supported by the locator 12 at the clamp fulcrum J1, and the cylinder 10 is rotatably supported at a clamp fulcrum $J_2$. When the cylinder 10 assumes the state shown by the solid lines in FIG. 5, the clamp arm 11 clamps the workpiece 16, while when the cylinder 10 assumes the state shown by the one-dot chain lines in FIG. 5, the state of the clamp arm 10 is changed from the clamping state to a state wherein it opens, for example, at 70 degrees.

The locator 12 is fixed to the stand 13 by means of bolts, and the stand 13 is fixed to the bed 101 by means of bolts.

STANDARD PART

FIGS. 6A and 6B show the kinds of the standard parts used in the CAD system and the selection conditions and the creation conditions for specifying the standard parts. Seven kinds of standard parts are shown as examples of the standard parts. The names of the seven standard parts are "stand" model, "cylinder" model, "clamp arm" model, "locator" model, "bed" model, "cylinder bracket" model and "fitting" model.

One characteristic of the system is that "the standard parts" are seized as the concept of "the selection conditions" and "the creation conditions". Namely, for example, in the case of the part concept "cylinder" model, the concept is first specified by the part name of cylinder and then specified by "the stroke length" and "the piston diameter" of the rod of the cylinder. If "the stroke length" and "the piston diameter" are specified for the "cylinder" model, an existing cylinder is specified. The standard part database PDB is designed so that not only the dimensions of the form of the standard part specified but also non graphic specifications such as the supply maker, the weight, the name form, the price and so forth can be extracted as determination specifications. The actual graphic form displayed is generated by a cylinder graphic generating program in accordance with the stroke length specified and the piston diameter specified. In the conventional CAD system, the term "parts" represents a collection of "display graphic data" which is specified by the part names. However, in the system of the present invention, the term "parts" represents only the concept specified by "the part names" and "the selection conditions" or "the creation conditions". Namely, automatic design may be carried out on the basis of the concept of "the part names" and "the selection conditions" or "the creation conditions". If graphic display is necessary, the standard part program is called together with a functional code which requires the generation of a graphic form in accordance with the part name so that a graphic form can be generated by the program called in accordance with the creation conditions. If no graphic display is required and the part specifications such as the format name, the dimensions and the maker name are required, the functional code for outputting the specifications and the standard part program are called so that the part specifications are output.

As described above, when a part model is formed in the process of forming a structural model, the specifications of the part serve as design conditions for another part so that the unit structures are materialized in linkage with each other. The design conditions of each of the parts are listed in the item of design conditions shown in Table 6.

BASIC LINKAGE MODEL

The concept of the basic linkage model is described below. Since the greatest problem of the CAD system is to reduce the number of steps for designing, it is preferable that the number of items to be designated and input by the operator is as small as possible. The most basic data is "the function of a jig", i.e., what is the purpose of use of the jig ?. For example, the function of the jig is to clamp, as in this enbodiment. In regard to the function of clamping, in this system, forms of clamping are previously formularized and classified as described below.

(a): Classification by the direction of extension of the clamp arm with respect to the receiving surface of a workpiece.

This depends upon the direction of extension of the form of a workpiece. In the example shown in FIG. 4, since the workpiece extends toward the right side, the clamp arm extends toward the left side.

(b): Classification by the state of the cylinder rod when the action of clamping is carried out.

(c): Classification by the position of the strut of the stand with respect to a drawing as shown in FIG. 4.

(d): Classification by the form of mounting of the cylinder and the clamp arm to the locator.

For example, whether the end of the clamp arm is connected directly to the end of the cylinder rod or with a joint portion therebetween, or whether the mounting position $J_1$ of the clamp arm to the locator is disposed above or under the mounting position $J_2$ of the cylinder to the locator.

(e): Classificaiton by the clamping force, i.e., classification by the clamping force which is set corresponding to the working portion.

(f) Classification by the unclamping angle (70 degrees in the example shown in FIG. 5).

(g): Classification by the number of positions of a workpiece at which clamping is performed and, when clamping is performed at a plurality of positions, by the number of locators by which a plurality of cylinders and clamp arms are supported.

In he CAD system of this embodiment, a plurality of "basic linkage models" which are formularized on the basis of the above-mentioned classifications are prepared and combined for each of the forms of jigs to form a model which is displayed as a menu panel on a work station 8 so that each of the models can be selected.

The basic linkage models are expressed as formula models comprising algebraic expressions, logical discriminants, vector expressions or character expressions. In the system of this embodiment, as shown in FIGS. 6A and 6B, one of the basic linkage models is selected if the receiving surface of the workpiece and the clamping form are specified. The structural models which form one basic linkage model specified are generated, and the selection conditions and the creation conditions of the part models are determined so that the basic linkage model, which comprises only formula expressions, can be fleshed out.

Figure 7:
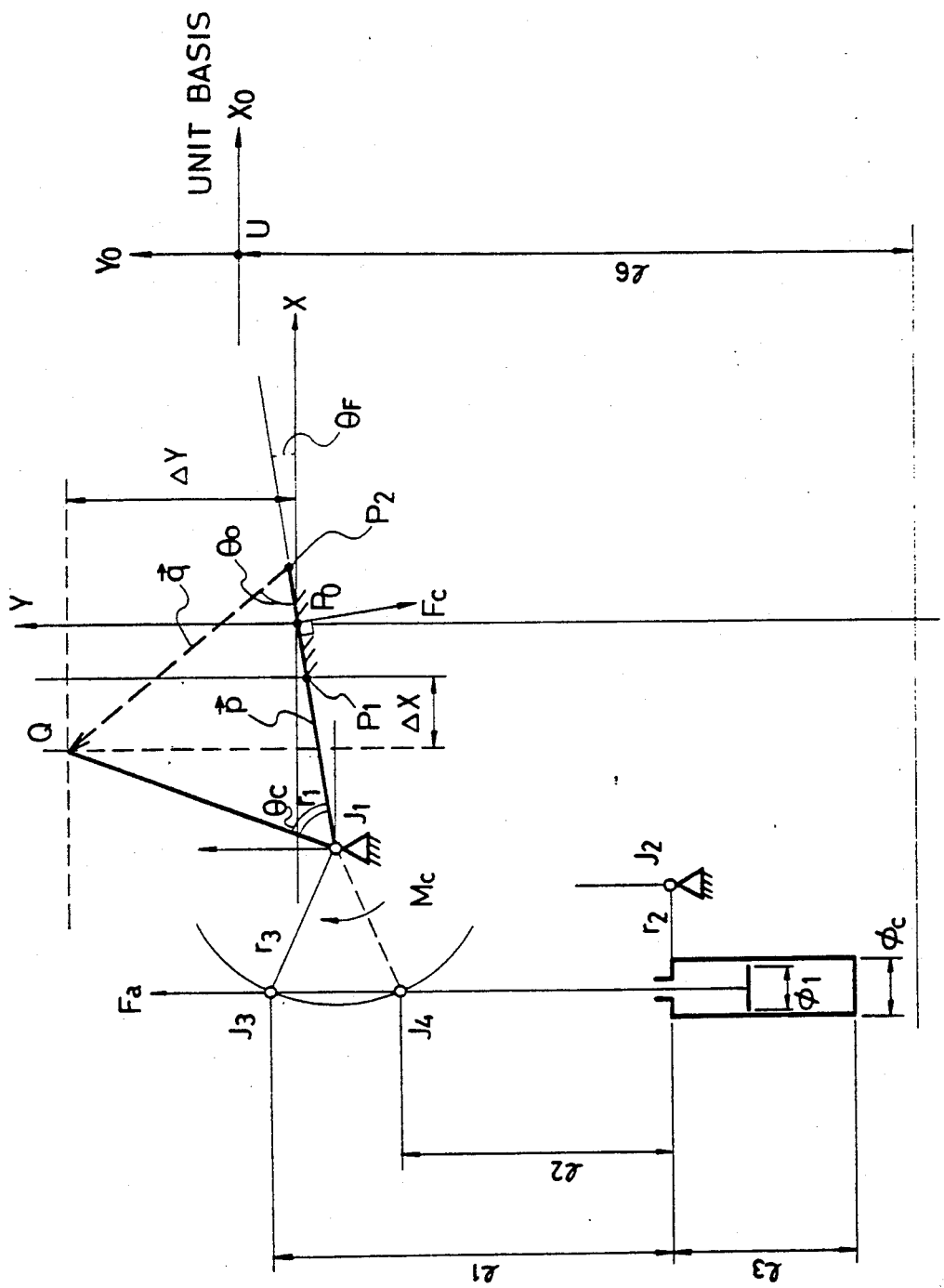
FIGS. 7 to 9 are drawings of a unit model of the clamp unit shown in FIG. 4.

The basic linkage models as formula models will be described below by using as an example the bearer unit 100 shown in FIG. 5. Each of the formula models expresses the geometrical disposal relationship between the part models which form one basic linkage model. FIG. 7 shows the geometrical model of the bearer unit 100 shown in FIG. 5. In the drawing, the symbols respectively represent the items shown in the table given below.

TABLE

| Symbol | Explanation | Note |
|---|---|---|
| $\Theta_F$ | Inclination angle of clamping surface | Angle on the X - Y plane |
| $\Theta_C$ | Unclamping angle | Specified by the type of the unit |
| $P_{0x}$ | (XYZ) coordinates | Coordinate value corresponding |
| $P_{0y}$ | at the center of | to the world coordinate |
| $P_{0z}$ | clamping surface | |
| $P_{1x}$ | (XYZ) coordinates | This point is positioned on the |
| $P_{1y}$ | at end point 1 of | cylinder side. Local coordinates |
| $P_{1z}$ | clamping surface | for $P_0$ |
| $P_{2x}$ | (XYZ) coordinates | This point is positioned on the |
| $P_{2y}$ | at end point 2 of | workpiece side. |
| $P_{2z}$ | clamping surface | Local coordinates for $P_0$ |
| $P_x$ | (XYZ) coordinates | Local coordinates for $P_0$ |
| $P_y$ | at end of clamper | |
| $P_z$ | during unclamping | |
| $J_{1x}$ | (XYZ) coordinates | Local coordinates for $P_0$ |
| $J_{1y}$ | at fulcrum at | |
| $J_{1z}$ | which clamper is fixed | |
| $J_{2x}$ | (XYZ) coordinates | Local coordinates for $P_0$ |
| $J_{2y}$ | at fixed fulcrum | |
| $J_{2z}$ | of cylinder | |
| $J_{3x}$ | (XYZ) coordinates | Local coordinates for $P_0$ |
| $J_{3y}$ | at contact point | |
| $J_{3z}$ | of clamp rod | |
| $r_1$ | Clamp arm length | $r_1 = J_1 P_2$ $= \{(J_{1x} - P_{2x})^2 + (J_{1y} - P_{2y})^2\}^{\frac{1}{2}}$ |
| $r_2$ | Cylinder link length | According to the specification of the cylinder specified. |
| $r_3$ | Clamp link length | $r_3 = J_1 J_3$ |
| $l_1$ | Clamp rod length during clamping | |
| $l_2$ | Clamp rod length during unclamping | |
| $l_3$ | Cylinder length | |
| $\phi_c$ | Outer diameter of cylinder | According to the specification of the cylinder specified. |
| $\Delta X$ | Distance in the X direction from $P_1$ at end of clamper | Design conditions |
| $\Delta Y$ | Distance in the Y direction from $P_1$ at end of clamper during unclamping | Design conditions |
| $F_c$ | Force exerting on clamping surface in the vertical direction | |
| $F_a$ | Cylinder output | |
| $M_c$ | Moment around fixed fulcrum of clamper | |
| $\phi_1$ | Required inner diameter of cylinder | Determined by clamp link length and $M_c$ |
| $l_L$ | Height of bed | Set at the start of design of jig |

TABLE-continued

| Symbol | Explanation | Note |
|---|---|---|
|  | surface |  |
| $S_1$ | Required stroke of cylinder |  |

DESIGN OF UNIT

As shown in FIG. 2, one basic linkage model comprises an organization model and a geometrical model. FIG. 7 shows an organization model for designing the unit shown in FIG. 5. The organization model shown in FIG. 7 contains only a clamper and a cylinder as simple parts. This is because, since the other parts, the stand and the locator, have no movable portion, the model is configured only by the cylinder and the clamper which have movable portions. That U is, the configuration of a model is specified by using only parts having movable portions (i.e., "the selection conditions" are calculated), and non.movable portions are then determined ("the creation conditions" are calculated). On the basis of the mechanism model shown in FIG. 7, the coordinates $J_1$ of the clamping fulcrum are first determined, and the following items are then determined:

Arm length of the clamper $r_1$
Angle during unclamping $\theta_c$
Link length of the clamper $r_3$
Coordinates $J_3$ at the contact point of the rod of the clamper
Stroke length of the cylinder
Internal diameter of the cylinder $\phi_1$
Fixing fulcrum of the cylinder $J_2$
Cylinder rod length during unclamping $l_2$ In the process for determining the above-described values, the values used at the starting point are the world coordinate values given below of the end points $P_1$ and $P_2$ of the surface of the workpiece 16 which is clamped and the values $\Delta X$ and $\Delta Y$ at the position of the end of the clamper during unclamping.

$P_1 (P'_{1x}, P'_{1y}, P'_{1z})$ $P_2 (P'_{2x}, P'_{2y}, P'_{2z})$

It is important that the above-described values for determining a geometrical model are obtained from those values. For convenience of description, it is assumed that $P'_{1z} = P'_{2z}$ The coordinates of $P_1$, $P_2$ are first converted into those relative to the standard point $P_0$ so that $P_1$ and $P_2$ are expressed by local coordinates, as described below.

$P_{1x} = P'_{1x} - P_{0x}$
$P_{1y} = P'_{1y} - P_{0y}$
$P_{1z} = P'_{1z} - P_{0z}$ $P_{2x} = P'_{2x} - P_{0x}$
$P_{2y} = P'_{2y} - P_{0y}$
$P_{2z} = P'_{2z} - P_{0z}$

If the inclination angle $\theta_F$ of the clamping surface is determined from these coordinates, the following equation is obtained:

$$\theta_F = \tan^{-1}\left(\frac{P_{2y} - P_{1y}}{P_{2x} - P_{1x}}\right)$$

Various values are then determined from the $\theta_F$ value and the $P_1$ and $P_2$ xpressed by the local coordinates.

Coordinate Values $J_1$ of Clamping Fulcrum

Les $\vec{s}$ be a unit vector in the direction of the line of intersection between the clamping surface and the X-axis, $\vec{p}$ be a vector from the point $P_2$ to the point $J_1$ and $\vec{q}$ be a vector from the point $P_2$ to the point Q, the following equations are obtained:

$$\vec{s} = \begin{pmatrix} \cos\theta_F \\ \sin\theta_F \end{pmatrix} \qquad (1)$$

$$\vec{p} = \overrightarrow{P_2 J_1}$$

$$\vec{q} = \overrightarrow{P_2 Q}$$

and $$\vec{p} = k \cdot \vec{s} \quad (k: \text{ a constant}) \qquad (2)$$

Since the arm of the clamper makes a rotational movement, the following equations are obtained:

$$|\overrightarrow{P_2 J_1}| = |\overrightarrow{Q J_1}| \qquad (3)$$

$$\vec{q} = \overrightarrow{P_0 Q} - \overrightarrow{P_0 P_2} \qquad (4)$$

If the following definition is given:

$$X = sgn(P_{1x}) \cdot \Delta X + P_{1x} \qquad (5)$$
$$y = \Delta Y$$

$$sgn(P_{1x}) = \begin{cases} 1; & \text{at } P_{1x} > 0 \\ -1; & \text{at } P_{1x} < 0 \end{cases} \qquad (6)$$

and let the values of $\Delta X$ and $\Delta Y$ denote condition valeus for designing the model shown in FIG. 7, the vector q is expressed by the following equation from Equation (4):

$$\vec{q} = \begin{pmatrix} x \\ y \end{pmatrix} - \begin{pmatrix} P_{2x} \\ P_{2y} \end{pmatrix} = \begin{pmatrix} x - P_{2x} \\ y - P_{2y} \end{pmatrix} \qquad (7)$$

From Equations (2), (3) and (4), the following equation is obtained:

$$|k \cdot \vec{s} - \vec{q}|^2 = |k \cdot \vec{s}|^2$$

When the substitution of this equation in Equation (7) and the following change of variables are made:

$$\alpha = x - P_{2x}$$

$$\beta = y = P_{2y}$$

the following equation is obtained:

$$k = \frac{\alpha^2 + \beta^2}{2(\alpha \cdot \cos\theta_F + \beta \cdot \sin\theta_F)} \qquad (8)$$

Since $p = k \cdot s$ from Equation (2), therefore, $$\vec{p} = \begin{pmatrix} \frac{\alpha^2 + \beta^2}{2(\alpha + \beta \tan\theta_F)} \\ \frac{\alpha^2 + \beta^2}{2(\alpha/\tan\theta_F + \beta)} \end{pmatrix}$$

and the coordinates $J_{1x}$, $J_{1y}$ of the clamping fulcrum are expressed by the following equation:

$$\begin{pmatrix} J_{1x} \\ J_{1y} \end{pmatrix} = \vec{p} + \vec{P_0 P_2} \qquad (9)$$

$$= \begin{pmatrix} \frac{\alpha^2 + \beta^2}{2(\alpha + \beta \cdot \tan\theta_F)} + P_{2x} \\ \frac{\alpha^2 + \beta^2}{2(\alpha/\tan\theta_F + \beta)} + P_{2y} \end{pmatrix}$$

In this way, the coordinate values of the clamping fulcrum $J_1$ are calculated. The effective range of the coordinates of the clamping fulcrum $J_1$ is then considered.

For example, in he case of a clamp unit such as the cradle unit 101, the position of the clamping point during unclamping is limited by the distance from the end point of a workpiece and the height from the clamping surface. Namely, are provided a design condition that the position of the clamping point must be separated at an appropriate distance from the workpiece so that the workpiece can be easily attached to and removed from the jig, and a design condition that the position must not be excessively separated so that any interference with other jigs is prevented, and the work is not hindered. The end point of the workpiece can be easily obtained from the data with respect to the shape of the workpiece. However, for the convenience of description, when the point $P_1$ is considered as the end of the shape of the workpiece, if the separation amount of the end Q of the clamper arm is $\Delta X$ and $\Delta Y$ during unclamping and if the allowable range for $\Delta X$ is $\Delta X_{min}$ to $\Delta X_{max}$, from the equation (5), when $P_{1x} < 0$ $$P_{1x} - \Delta X_{min} \geq X \geq P_{1x} - \Delta X_{max} \qquad (10)$$

and when $P_{1x} > 0$, within the range:
$$P_{1x} + \Delta X_{min} \leq X \leq P_{1x} + \Delta X_{max} \qquad (11)$$

$J_{1x}$ becomes effective. For Example, $\Delta X_{min}$ and $\Delta X_{max}$ are respectively 30 mm and 100 mm.

Arm Length $r_1$ of Clamper

The arm length $r_1$ of the clamper is obtained from the following equation:

$$r_1 = |\vec{J_1 P_2}| = |\vec{p}| = |k| \qquad (12)$$

$$= \left| \frac{\alpha^2 + \beta^2}{2(\alpha \cdot \cos\theta_F + \beta \cdot \sin\theta_F)} \right| \qquad (13)$$

Unclamping Angle $\theta_c$

Since the inner product $$(\vec{J_1 Q}, \vec{s})$$

of the vectors $$\vec{J_1 Q}$$

and $\vec{s}$ is $$(\vec{J_1 Q}, \vec{s}) = |-\vec{Q J_1}| \cdot |\vec{s}| \cdot \cos\theta_c$$
$$= |k| \cdot \cos\theta_c$$

the unclamping angle $\theta_c$ is $$\theta_c = \cos^{-1} \frac{(-\vec{Q J_1}, \vec{s})}{|\vec{Q J_1}|} \qquad (14)$$

$$= \cos^{-1} \frac{(x - J_{1x}) \cdot \cos\theta_F + (y - J_{1y}) \cdot \sin\theta_F}{|k|}$$

Link Length $r_3$ of Clamper

If the force required for clamping the workpiece 16, which is measured in the direction vertical to the surface, is $F_c$ (for example, 40 Kg: design constant) and if the output of the cylinder $F_a$, the moment $M_c$ required rotation around the clamping fulcrum is $$M_c = F_c \cdot r_1$$

Such design conditions that the moment $M_c$ is balanced with the moment by the cylinder and that the deflection angle of the cylinder is the minimum are shown by the following expression:

$$F_a \cdot r_3 \cdot \cos\frac{\theta_c}{2} \geq M_c$$

Therefore, the following expression is obtained:

$$r_3 \geq \frac{M_c}{F_a \cdot \cos(\theta_c/2)}$$

On the other hand, since $r_3$ must not be so long that the clamper interferes with other jigs or hinders the work, the following maximum value $r_{3max}$ is given as a design condition:

$$r_3 \leq r_{3max}$$

$r_3$ is therefore effective within the the following range:

$$\frac{M_c}{F_a \cdot \cos(\theta_c/2)} \leq r_3 \leq r_{3max} \qquad (15)$$

Output $F_a$ of Cylinder

From the formula (15), the output of the cylinder should be $$F_a \geq \frac{M_c}{r_3 \cdot \cos(\theta_c/2)} \qquad (16)$$

A decision is made as to whether or not the design conditions expressed by the equations (15) and (16) are satisfied by substituting a value, which is previously assumed, for example, the standard design value or the like, for the value of $r_3$ or $F_a$, starting calculations using the $r_a$ or $F_a$ value, repeating a series of calculations described below, and making a decision whether or not the equations (15) and (16) are established in accordance with the various values obtained from the series of calculations.

Coordinate $J_3$ of Contact Point Between Clamper and Rod

Figure 8:
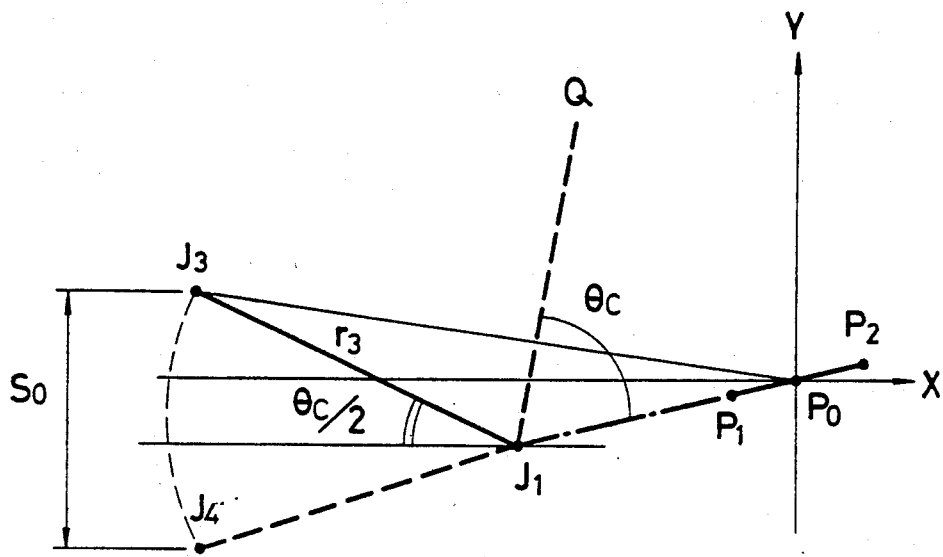

FIG. 8 is obtained by rewriting the drawing in FIG. 7 for the purpose of causing the contact point $J_3$ for connecting the clamper to the rod to be easily derived in a local coordinate system. As can be seen from FIG. 7, the three vectors has the relationship $$\overrightarrow{P_0 J_3} = \overrightarrow{P_0 J_1} + \overrightarrow{J_1 J_3}$$

Since $$\angle J_4 J_1 J_3 = \angle P_0 J_1 Q = \theta_c,$$

$$\overrightarrow{P_0 J_3} = \begin{pmatrix} J_{3x} \\ J_{3y} \end{pmatrix}$$

$$= \begin{pmatrix} J_{1x} + sgn(P_{1x}) \cdot r_3 \cdot \cos(\theta_c/2) \\ J_{2y} + r_3 \cdot \sin(\theta_c/2) \end{pmatrix}$$

Required Stroke $S_1$ of Cylinder

Since it is found from FIG. 8 that the stroke amount
$$S_0 = 2 \cdot r_3 \cdot \sin(\theta_c/2),$$

when a margin of length $\Delta S$ (for example, 10 mm: design constant) is taken into account, the required stroke length $S_1$ is
$$S_1 = S_0 + \Delta S.$$

Selection of Cylinder

Under the design conditions that the cylinder has output efficiency of $\eta_a$ and is operated at air pressure of P, the internal diameter $\phi_1$ of the cylinder is given as the following equation:

$$\phi_1 = \sqrt{\frac{F_a \cdot \eta_a}{\pi}}$$

Figure 9:
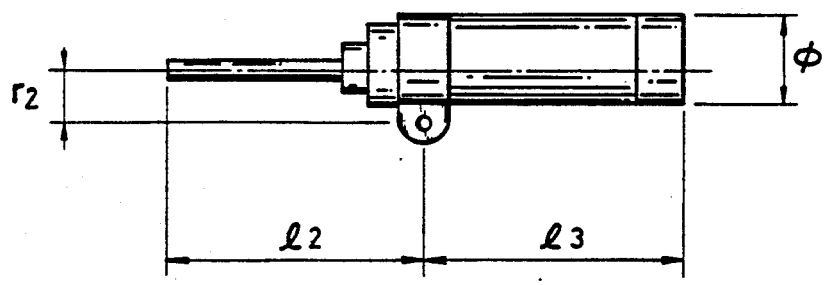

The cylinder and the bracket therefor, which satisfy the above-described required stroke $S_1$ and the internal diameter $\phi_1$, are selected by searching the standard database for the cylinder. From the thus-selected cylinder and bracket, the cylinder link length $r_2$, the cylinder rod length $l_2$ during unclamping and the cylinder length $l_3$ are determined, as shown in FIG. 9.

Coordinate $J_2$ of Fixing Fulcrum of Cylinder

The coordinates $J_2$ of the fulcrum for fixing the cylinder 10 to the locator are easily obtained from FIG. 7 and the coordinate position $J_4$ of the fulcrum during unclamping.

$$J_{2x} = J_{4x} - sgn(P_{1x}) \cdot r_2$$

$$J_{2y} = J_{4y} - l_2$$

$J_4$ is easily determined as a position of $J_3$ which is rotated for the angle $\theta_c$.

Rod Length During Unclamping

The rod length is $$l_1 = l_2 + S_0.$$

In this way, when a basic linkage model is selected by using the shape of the clamping surface (coordinates of $P_1$, $P_2$) and when the clamping force $F_a$ and the position of the clamper arm during unclamping (clearance in unclamping) are determined, the following values are calculated:

Arm length $r_1$ of clamper
Angle $\theta_c$ during unclamping
Link length $r_3$ of clamper
Coordinates $J_3$ of joint of clamper rod The clamper arm can be designed by using these values. On the basis of the designed clamper arm, the values given below of the cylinder 10 which are specified in the items for the clamper arm are then selected.

Stroke length $S_1$ of cylinder
Internal diameter $\phi_1$ of cylinder
Fixing fulcrum $J_2$ of cylinder
Cylinder rod length $l_2$ during unclamping Of the movable portions, the whole of the clamper art is designed and created, while the cylinder is selected from the existing standard parts.

Inspection

Since there are cases in which the results of calculations of "the selection conditions" and "the creation conditions" are unsuitable for practical use in the above-described process of calculating them, decisions are made on these conditions.

Figure 10:
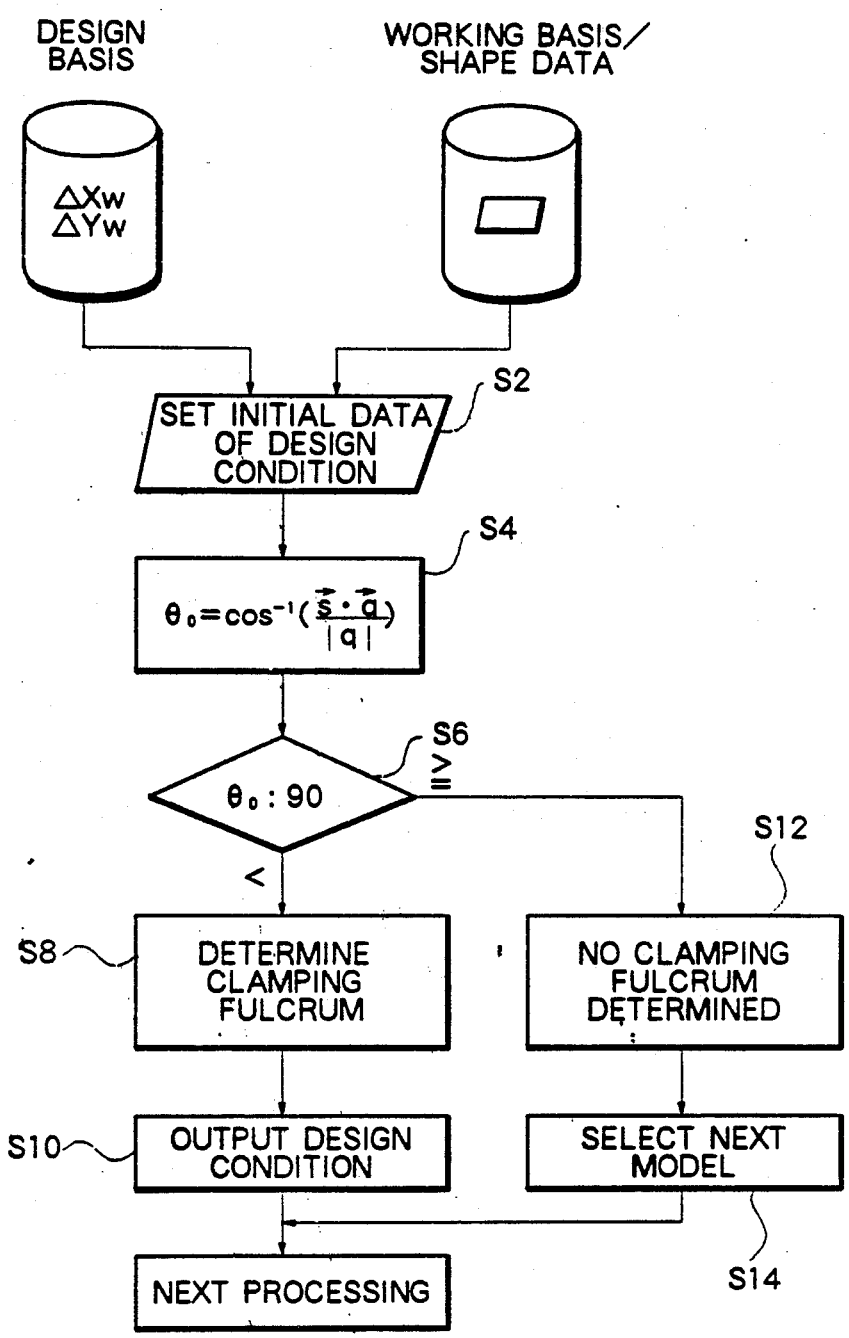
FIG. 10 is a flow chart which shows the control procedure for evaluating the same unit model.

FIG. 10 partially shows a decision program using as an example the clamper arm. In Step 2 in FIG. 10, the initial data for the creation conditions such as data for the receiving surface is set. In Step 4, the angle $\theta_0$ formed by the receiving surface and the vector $\vec{q}$ when the clamper arm is at the unclamping position is calculated. This angle is easily calculated from the definition of the inner product of the vectors $\vec{s}$ and $\vec{q}$.

$$\theta_c = \cos^{-1} \frac{(\vec{s} \cdot \vec{q})}{|\vec{s}|}$$

If the angle $\theta_c$ is logically over 90 degrees, the structure of the clamp unit of the present invention has no determined fulcrum and is thus not established. Thus, if $\theta_c > 90°$, since the selected basic linkage model is unsuitable, a next basic linkage model having a different structure is selected in Step 14.

Creation of Locator Shape

When the clamping fulcrum $J_1$ at which the clamper arm clamps the locator and the mounting fulcrum $J_2$ at which the cylinder is mounted on the locator are determined, the shape of the locator can be created.

Namely, the stand is determined by its type and the basic height from the bed surface, as shown in the standard part table in FIGS. 6A and 6B. When the locator is connected to the stand, it is necessary to enable the bolting at four positions at the minimum on the connection surface for the purpose of strongly connecting the locator. The width (distance between A and B in FIG. 11) of the upper portion of the locator is limited by $J_1$ and the position of the receiving surface. The width (distance between $S_1$ and $S_2$ in FIG. 11) of the lower portion of the locator is limited by the width of the stand. In order to connect the locator with the stand by bolting at at least four positions, therefore, the four shape patterns shown in FIG. 11 can be logically obtained.

FIG. 11 shows the logical decision on the basis of which a shape of the mounting portion of the locator on the stand is selected from the four shape patterns by using the end points A, B on the locator side and the end points Sl, $S_2$ on the stand side. In FIG. 11, $x_1, x_2, X_1$ and $X_2$ are defined as follows:

$$A(x_1\ y_1), \quad B(x_2\ y_2)$$
$$R_1(X_1\ Y_u), \quad R_2(X_2\ Y_u)$$
$$S_1(X_1\ Y_L), \quad S_2(X_2\ Y_L)$$

In the logical decision shown in FIG. 11, for example, if a locator having a shape having as a side the segment connecting the points B and $S_2$ is selected in the logical decision on the first pattern, there is the possibility that bolting is unable at the position $R_2$. In order to avoid the possibility, therefore, a locator shape in which the points B and $R_2$ connect to each other is selected.

The above-mentioned mathematical model and the design conditions are only examples, and the contents thereof should not be limited. In other words, it is possible to add other conditions or other mathematical processing to the above embodiments.

Operation Procedure

Figure 12:
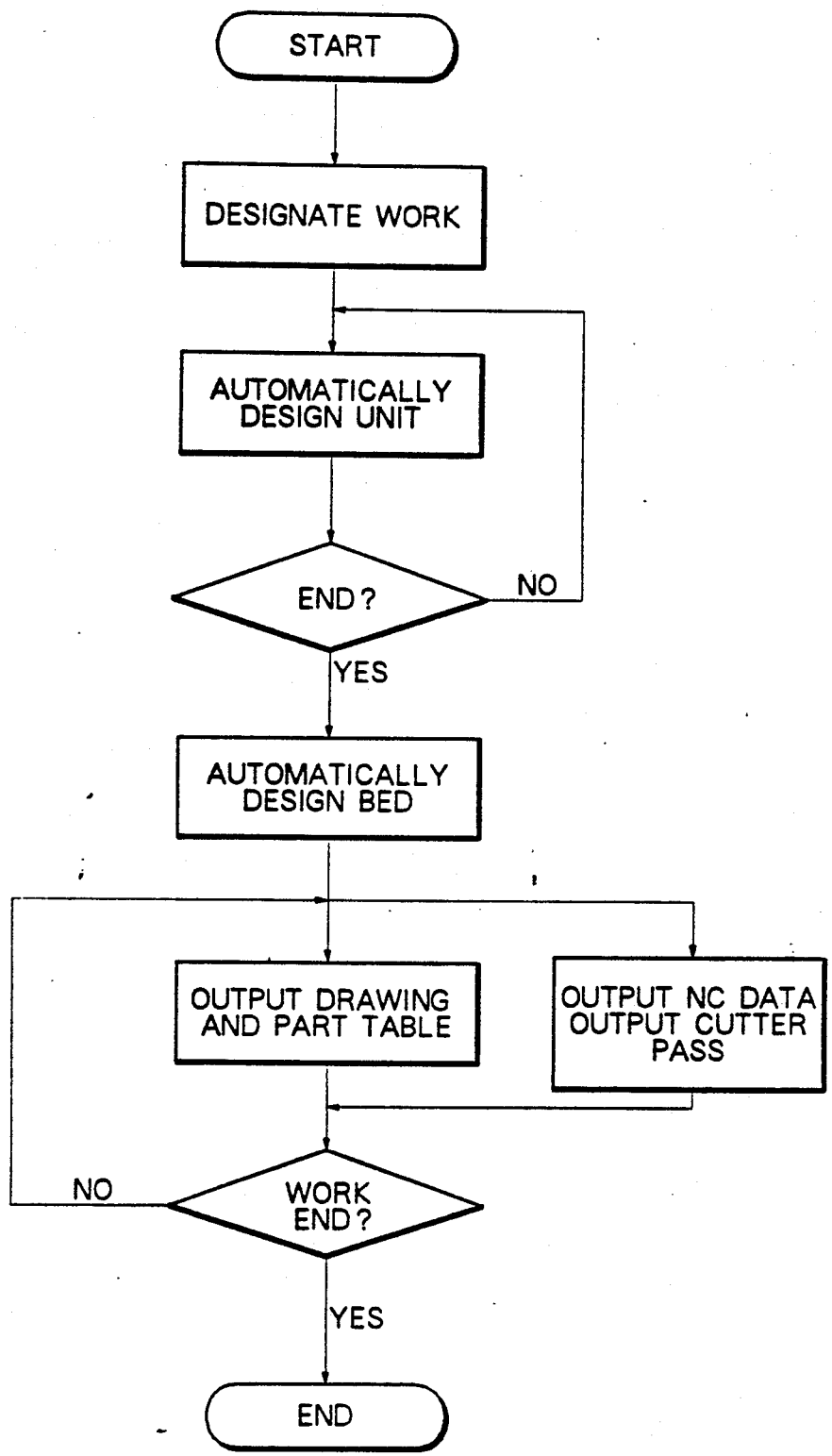
FIG. 12 is a flow chart which shows the working procedure of the system shown in FIGS. 3A and 3B.
Figure 13B:
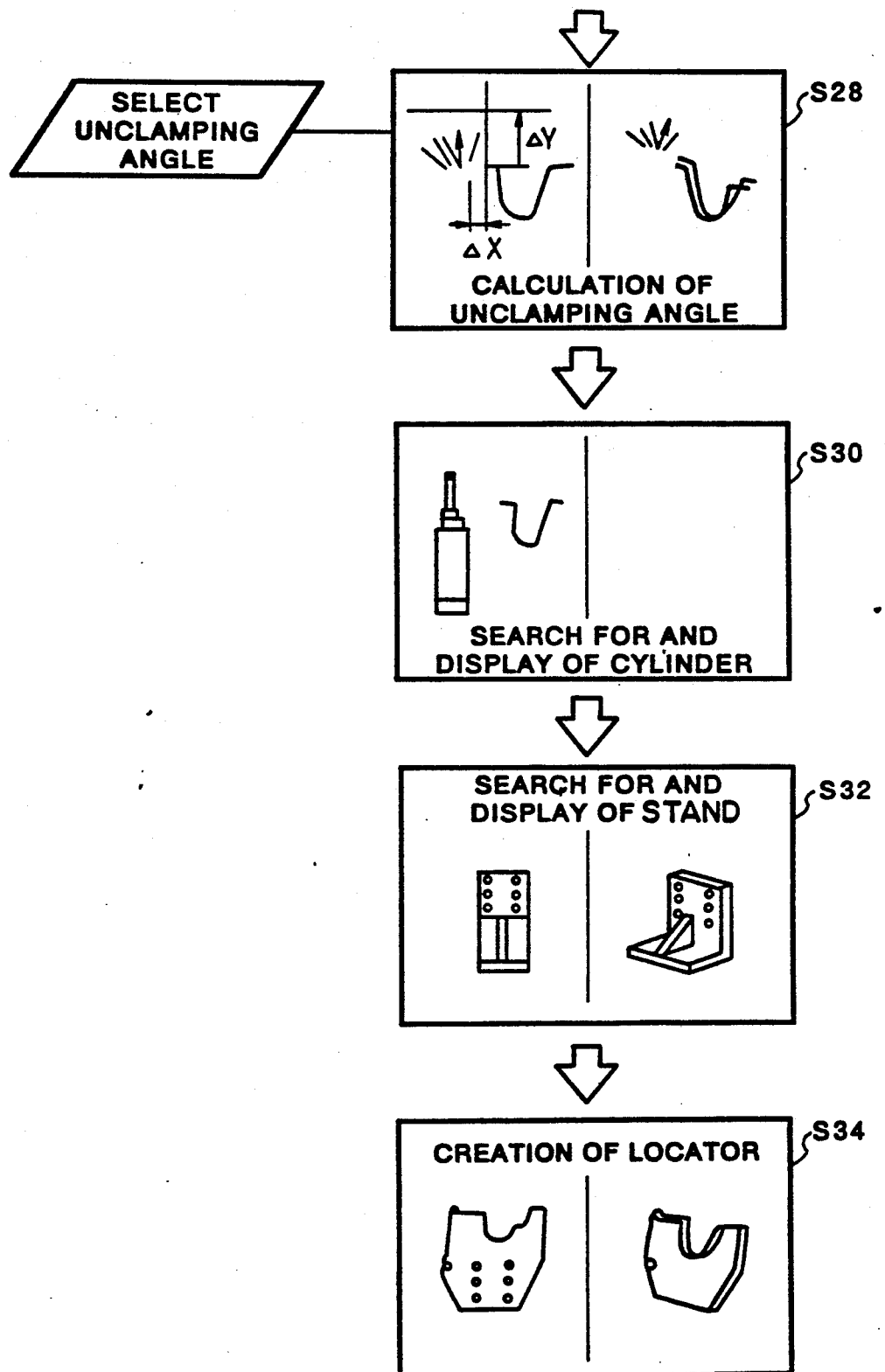
Figure 13C:
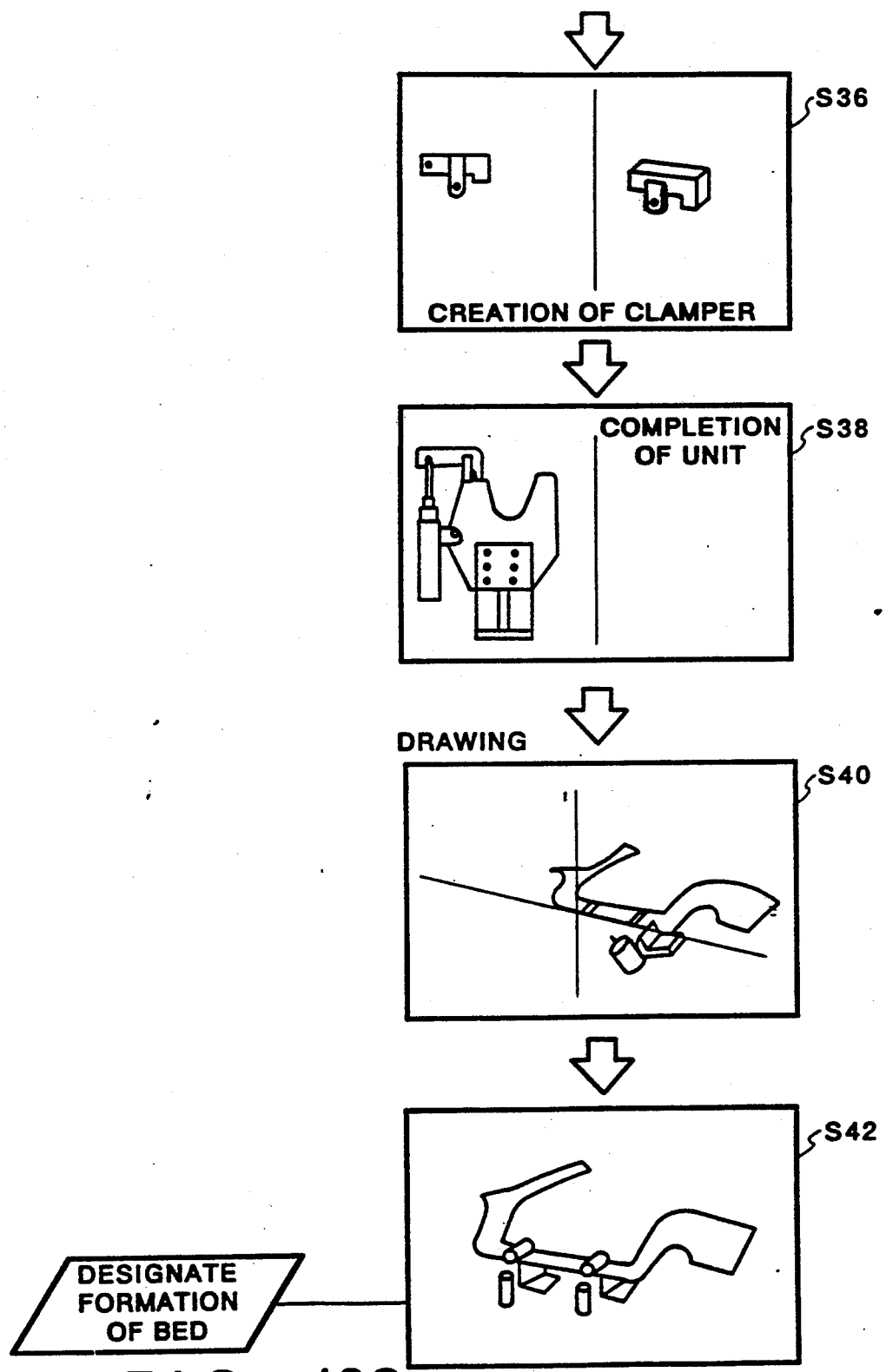
Figure 13D:
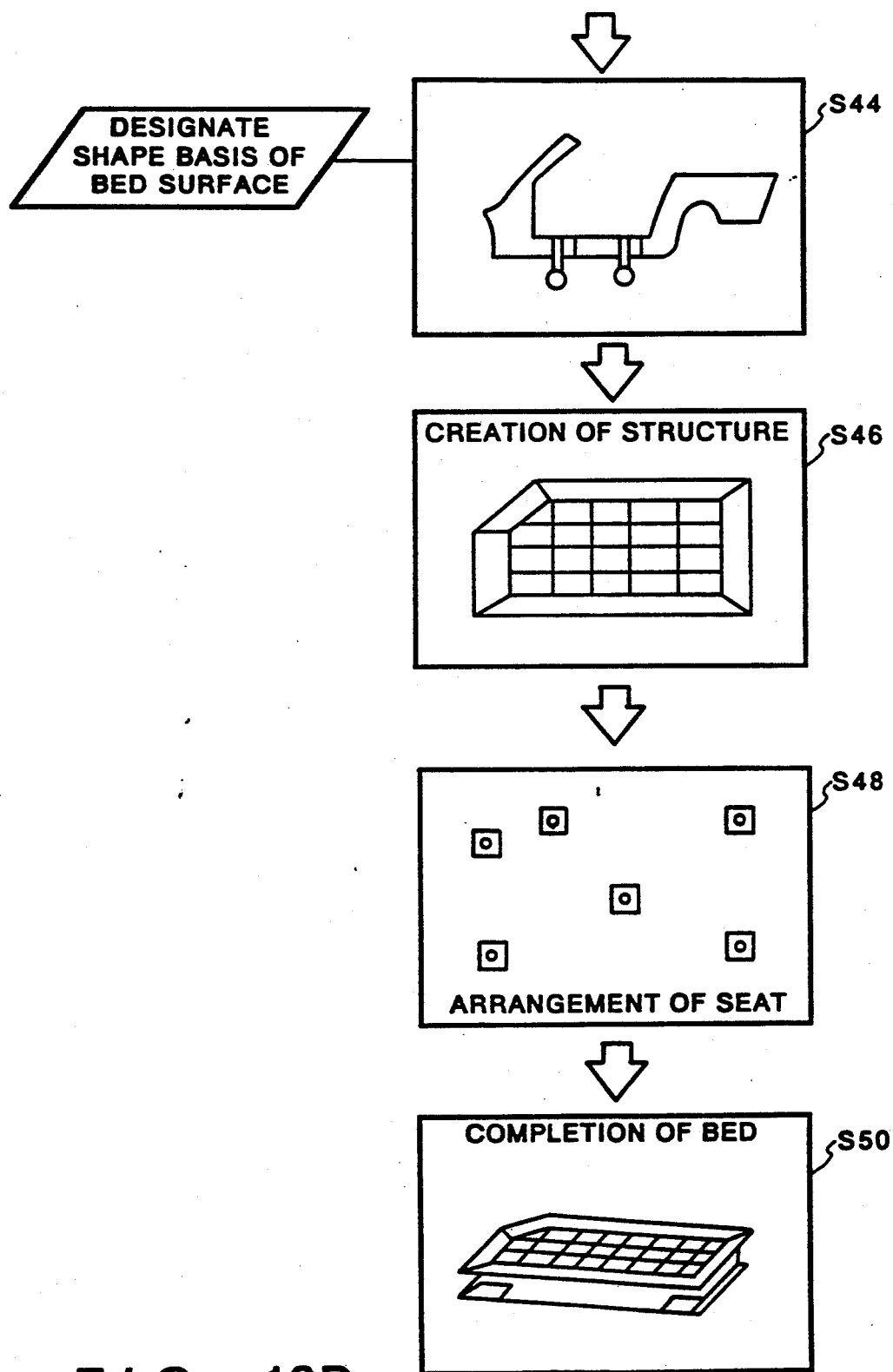
Figure 13E:
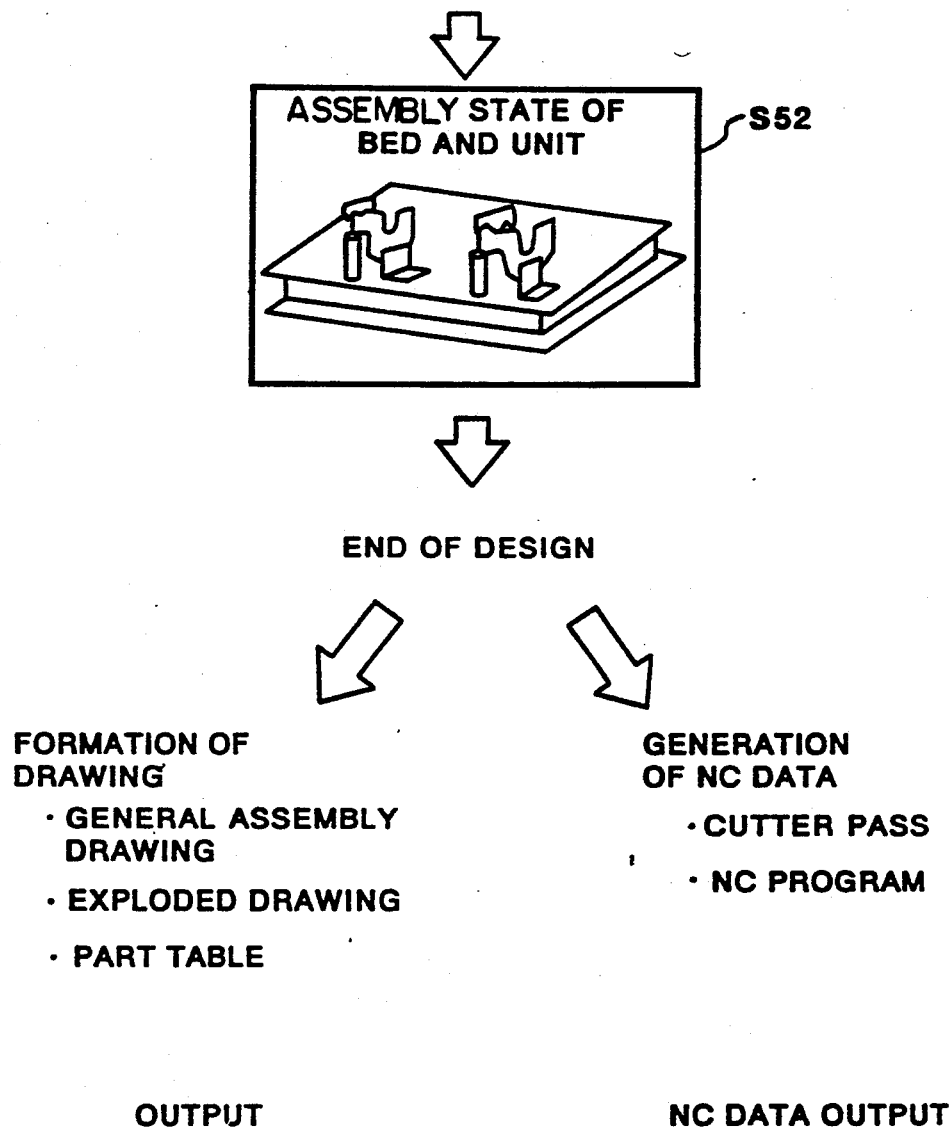

FIG. 12 shows the working procedure of the CAD system of the present invention. FIGS. 13A to 13E show a specific operating procedure of the same system. The operating procedure is described below with reference to FIGS. 13A to 13E. In FIGS. 13A to 13E, a portion denoted by a rectangle in each of the steps shows the display screen of each of the work stations.

In Step S20, the direction and the height of the bed surface and the working basis are input. A work is displayed on the screen on the basis of the input working basis. In Step S22, the working surface is designated. In Step 26, the receiving surface is designated. In Step S28, the unclamping angle of the clamp arm which satisfies the design conditions is selected and displayed.

On the basis of these input conditions, the selection conditions an the creation conditions are calculated with reference to the above.described basic linkage model, and the processing in Steps S30 to 36 is then performed. That is, in Steps S30 and S32, search for a cylinder and an stand is made in the standard part database in accordance with the selection conditions, and the searched cylinder and stand are displayed. In Step S34, a locator is created and displayed, and in Step S36, a clamper arm is created and displayed. In Step S38, the outline of the completed cradle unit is displayed. In Step S40, the drawing of the unit is output.

Since a plurality of cradle units are necessary for one workpiece, processing in Steps S20 to S38 is repeated for each of the units. In Step 40, for convenience' sake, a case in which the positional relationship between one unit and one workpiece is shown. A description will be given of the work supposing that the work is supported by three cradle units.

In Step S42, the formation of a bed is designated. In Step S44, the basis of the shape the bed surface is input. This basis is limited by the shape of the workpiece, as shown in FIGS. 6A and 6B.

Figure 18:
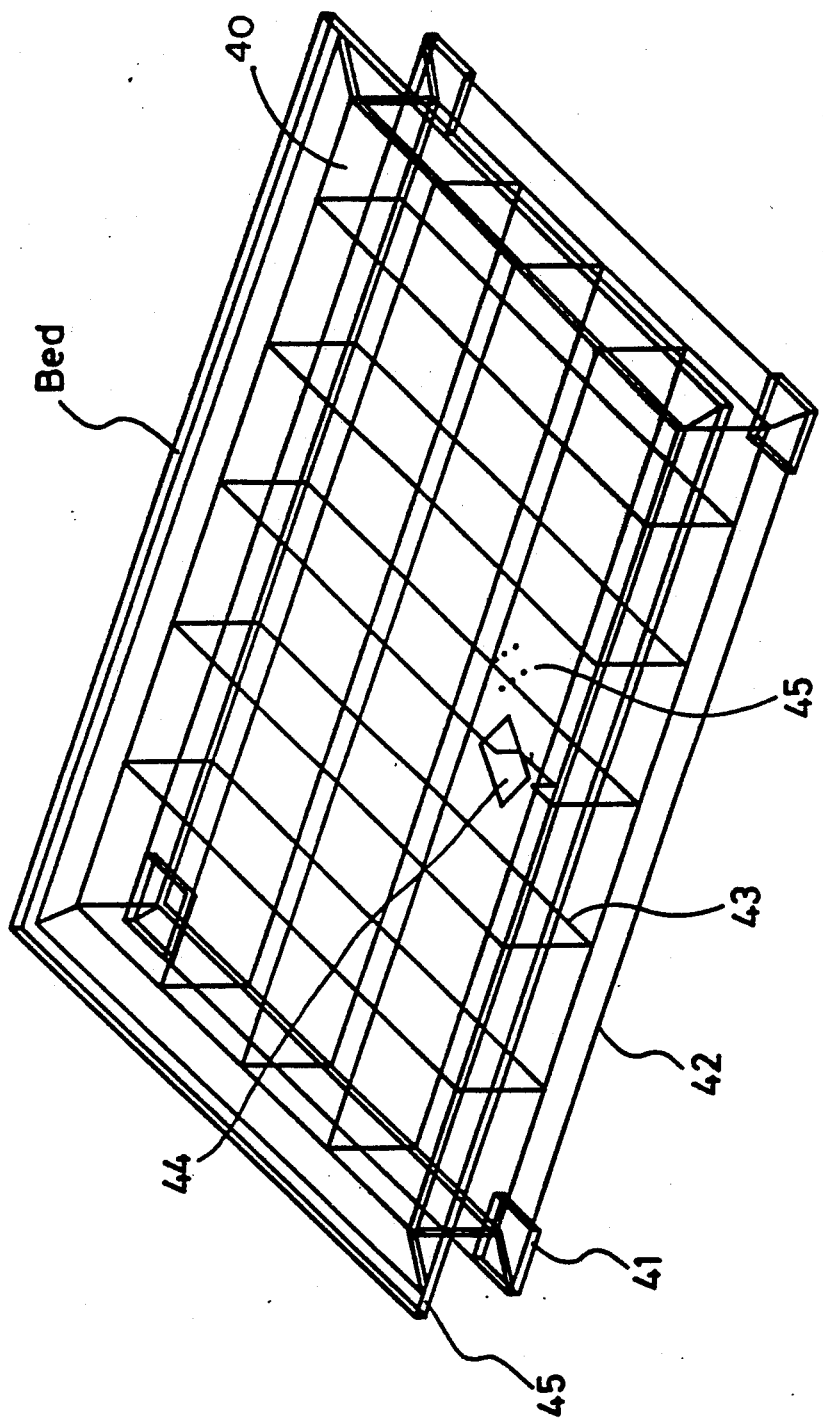
FIG. 18 is a drawing provided for explaining the design of the form of a bed.

As shown in FIG. 18, stand mounting holes 45 and a cylinder hole 44 used when the cylinder interfere with the bed surface are created on the basis of the configuration data (FIG. 15D, described below) of the units on the bed surface. In Step S46, the structure of the bed surface is generated, and in Step S48, the arrangement of seats (denoted by 41 in FIG. 18) on the bed surface is displayed as shown in FIG. 18, and in Step S50, a perspective view of the whole of the bed surface is displayed. In Step S52, a drawing of a state wherein the units are mounted on the bed is displayed.

In FIG. 18, reference numeral 40 denotes an upper plate; reference numeral 42, a peripheral channel structure; and reference numeral 43, an internal structure (flat bar). The stand mounting holes 45 comprise stand mounting basic knock holes and bolt holes. The mounting holes 45 and the escape hole 44 are generated by using the configuration data for the clamp units on the bed surface and the structural models of the units.

In this way, when the design is finished, the drawing and NC data ar formed.

Data Structure in System

Figure 14:
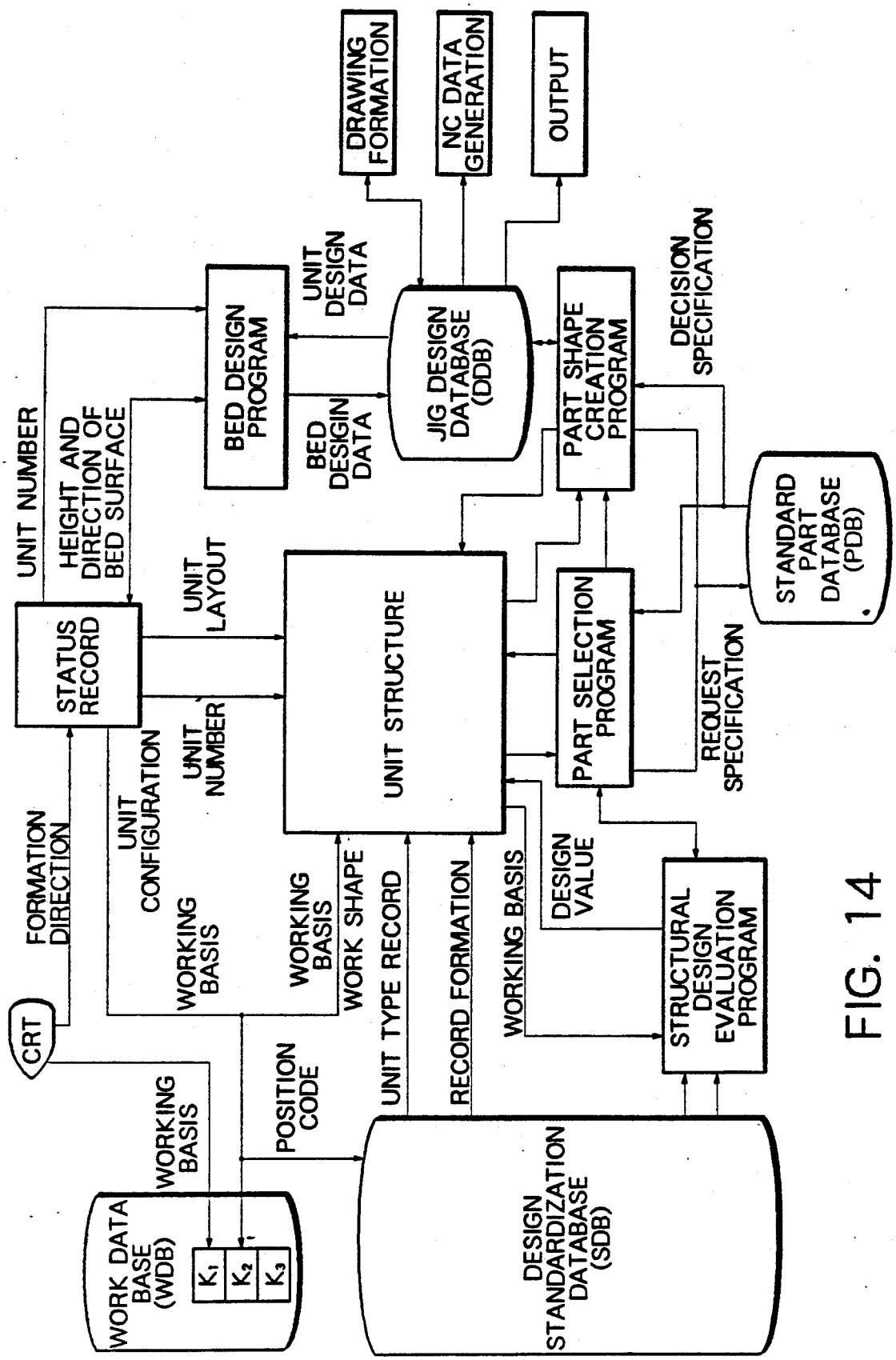
Figure 15B:
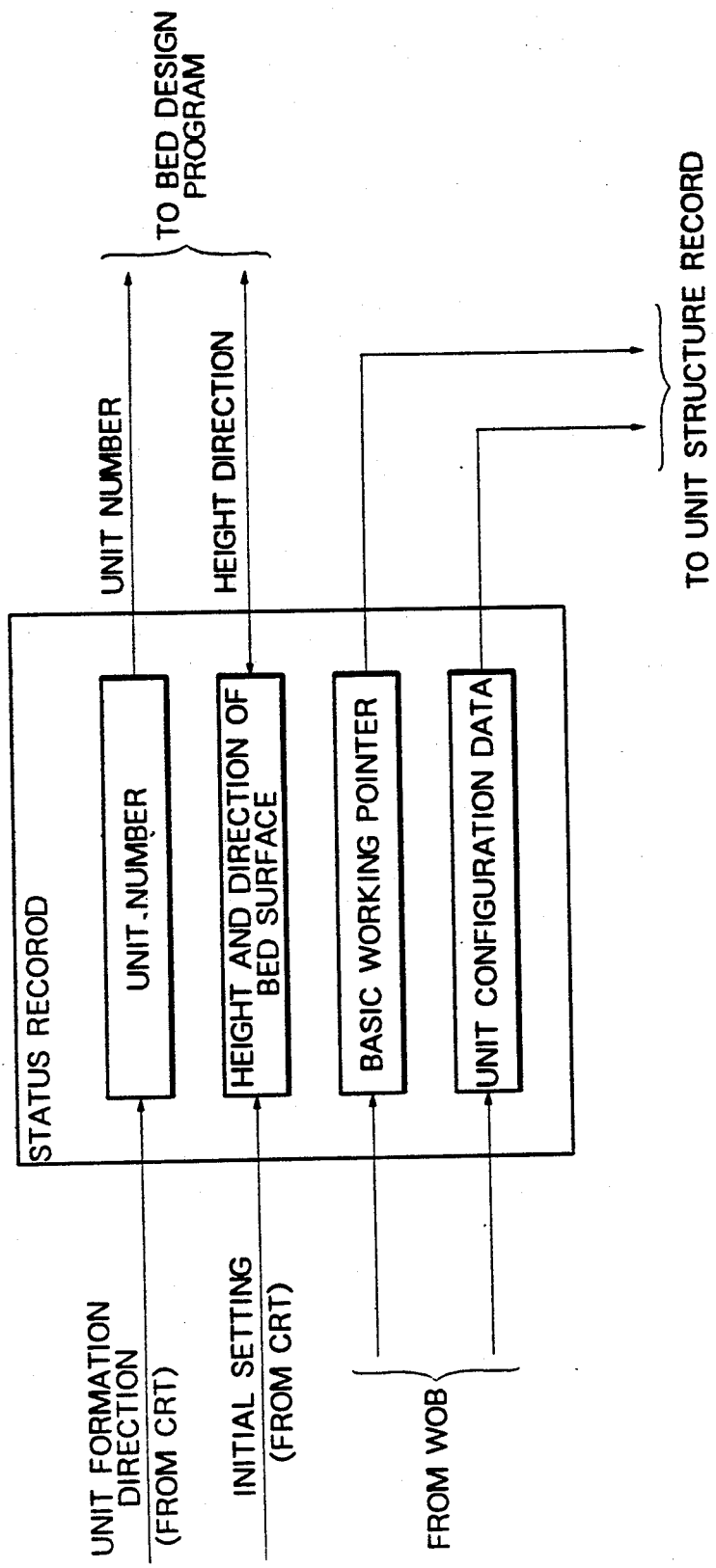

FIG. 14 is a drawing of a relationship between the respective databases in this CAD system. FIGS. 15A to 15F show in detail the flow of the data shown in FIG. 14. FIG. 15A shows the work master database (WDB). FIGS. 16A to 16D show the outline of the processing in the system for designing jig units.

The outline of the data structure is described below with reference to FIGS. 14 to 16.

When the formation of a unit is designated from the work station (Step S100 in FIG. 16A), a status record (FIG. 15B) for managing the progress state of automatic design, e.g., the number of units so far formed, is formed, as well as the working basis (working position) being set in the work station (Step S104). The position codes K are selected from the WDB (refer to FIG. 15A) on the basis of the working basis. The position codes are indexes which indicate a plurality of working positions in each workpiece. From the WDB are output the position codes K directed to a design standardization database SDB (FIG. 15C), the status recor (FIG. 15B) and the unit arrangement data and the shape data of the works and the working positions which are directed to the unit structure record (FIG. 15D). The unit arrangement data is data with respect to the positions at which the jig units formed are disposed on the bed.

Figure 15C:
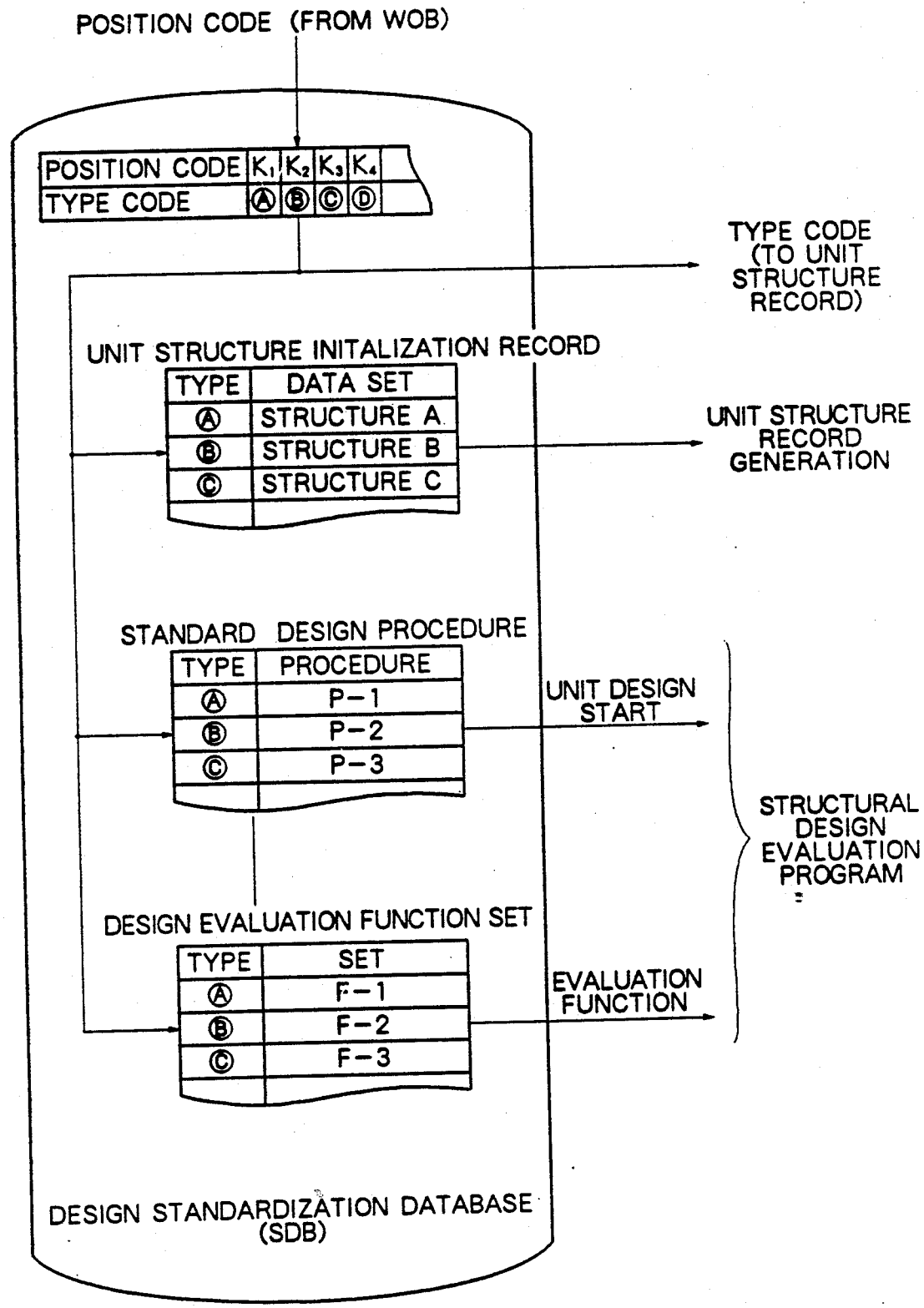
Figure 15D:
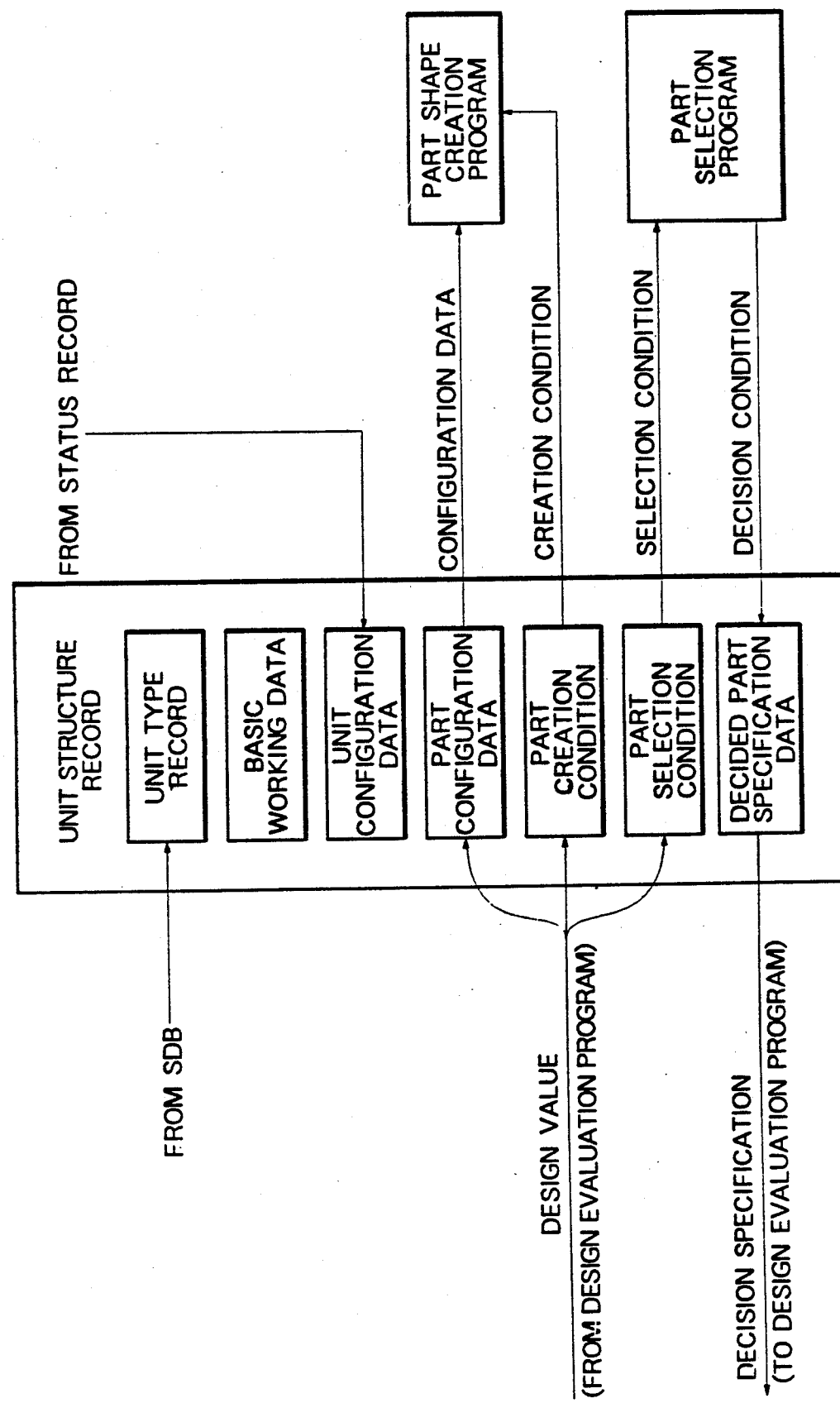
Figure 15E:
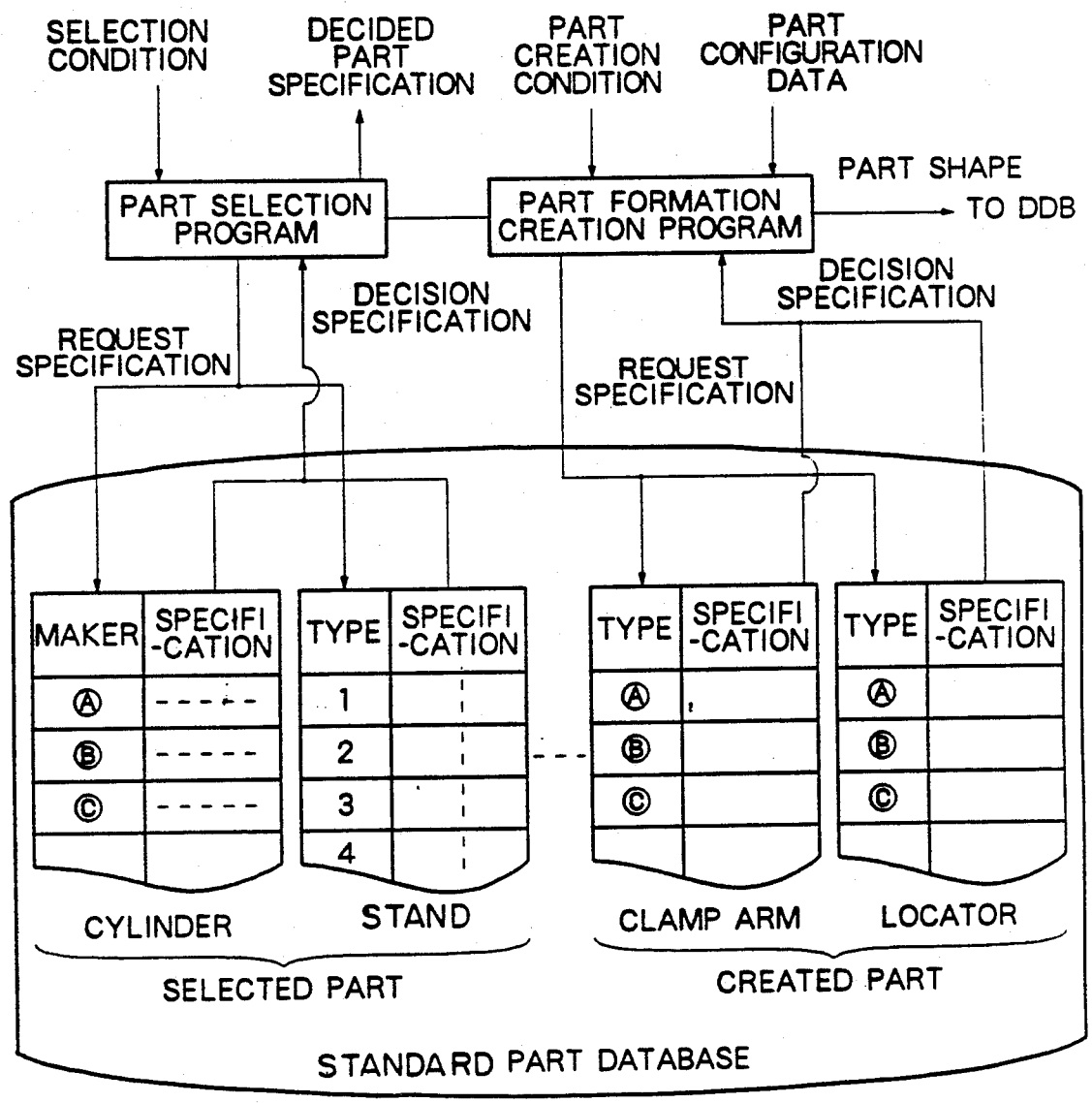

The position codes K are used for indexing the unit structure record, a standard design procedure and a set of design evaluation functions, as shown in FIG. 15C. The standard design procedure is unique for the type of each jig, for example, in the case of the unit shown in FIG. 4, the standard procedure is a program containing the procedure comprising the steps of first designing a cylinder and an stand which are selected parts, and then designing a locator and a clamp arm, which are parts having created forms, on the basis of the selected parts so that basic linkage models are generated and expressed in accordance with the procedure. The evaluation function set comprises, for example, the mathematical models which respectively correspond to the basic linkage models and which are described above with reference to FIGS. 7 to 11.

The structural design evaluation program for a jig is started in accordance with the selected procedure and evaluation function set. The unit structure record is also generated and initialized. The above-described structure model generated by using the unit arrangement data, the workpiece shape and working position shape data and the part design conditions are stored in the unit structure record.

The structural design evaluation program started outputs the selection conditions to the part selection program and the creation conditions to the part shape creation program. The part selection program and the part shape creation program output as request specifications the selection conditions and the creation conditions to the standard part database RDB (FIG. 15E) and input as decision specifications. The programs return the decision specifications to the structural design evaluation program used for evaluation.

The decided part specifications are stored as three-dimensional data in the jig design database (DDB) by the shape creating program.

Figure 15F:
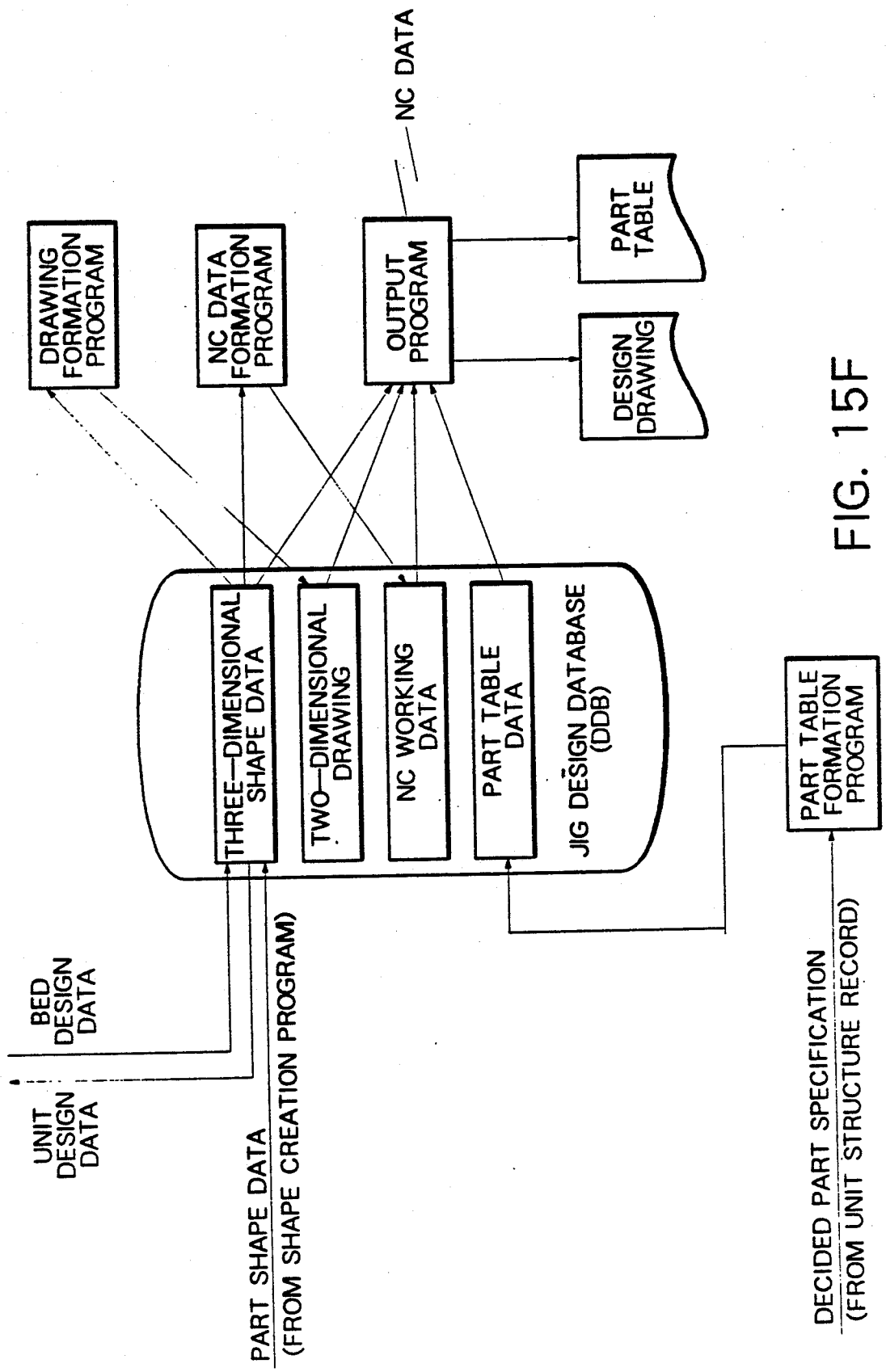

As shown in FIG. 15F, the drawing formation program, NC data generation program, the three dimensional data stored in DDB and various output programs generate and output two-dimensional drawings and the NC working data.

Figure 16A:
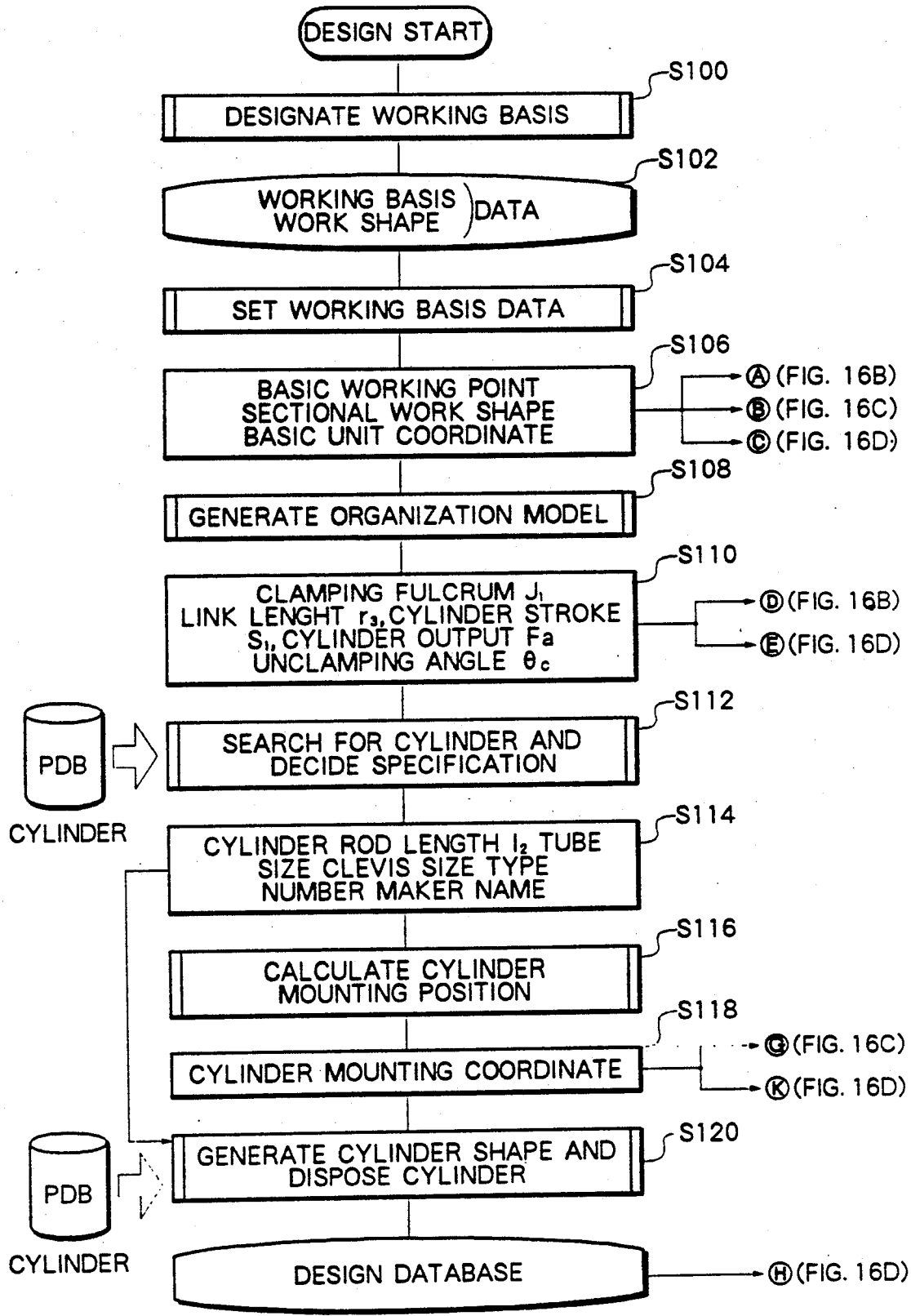

The parallel processing procedure from the generation of the structural models (Step S108) to the generation of each part is described below with reference to FIGS. 16A to 16D. The meanings of the symbols shown in the drawings are shown in FIG. 16E. In the drawings, symbol (a) represents processing operated by the evaluation function corresponding to each of the unit types; symbol (b), the data values stored in the boundary condition record in the unit structure record; symbol (c), the jig design database DDB; and symbol (d), the standard part database PDB.

When the clamping fulcrum $J_1$, the link length $r_2$, the stroke length $S_2$ of the cylinder, the cylinder output Fa and the unclamping angle $\theta_c$ are determined in Step S110, the specifications of the cylinder are determined in Step S112 and the rod length, type number and so on are input as decision specifications from the standard part database PDB. In Step S116, the cylinder mounting position $J_2$ is calculated from the decision specifications, and in Step S120, the shape of the cylinder is generated and disposed, as well as the data with respect to the cylinder being used for selecting the stand in Step S160.

In Step S130, the shape of the clamper is created on the basis of the clamping fulcrum coordinates $J_1$ calculated in Step S110 and the working basis data.

In Step S160, the basic height of the stand is set for selecting an stand on the basis of the basic working position and the sectional shape of the workpiece and the cylinder mounting position $J_2$ obtained in Step S118. In Step S164, the stand is selected from the standard part database.

In Step S140, the shape of the locator is created. In Step S140, the shape of the receiving surface (clamping surface shape) of the locator is created on the basis of the working basis. The creation of the shape of the receiving surface on the basis of the working basis (receiving surface shape of the workpiece) contributes to an improvement in the working precision of a jig, as described above. In Step S144, the clamp arm mounting position $J_1$, the cylinder mounting position $J_2$ and the bolt mounting positions for the stand in the locator are input so that the shape of the locator is generated. This is described above with reference to FIG. 11.

Figure 17:
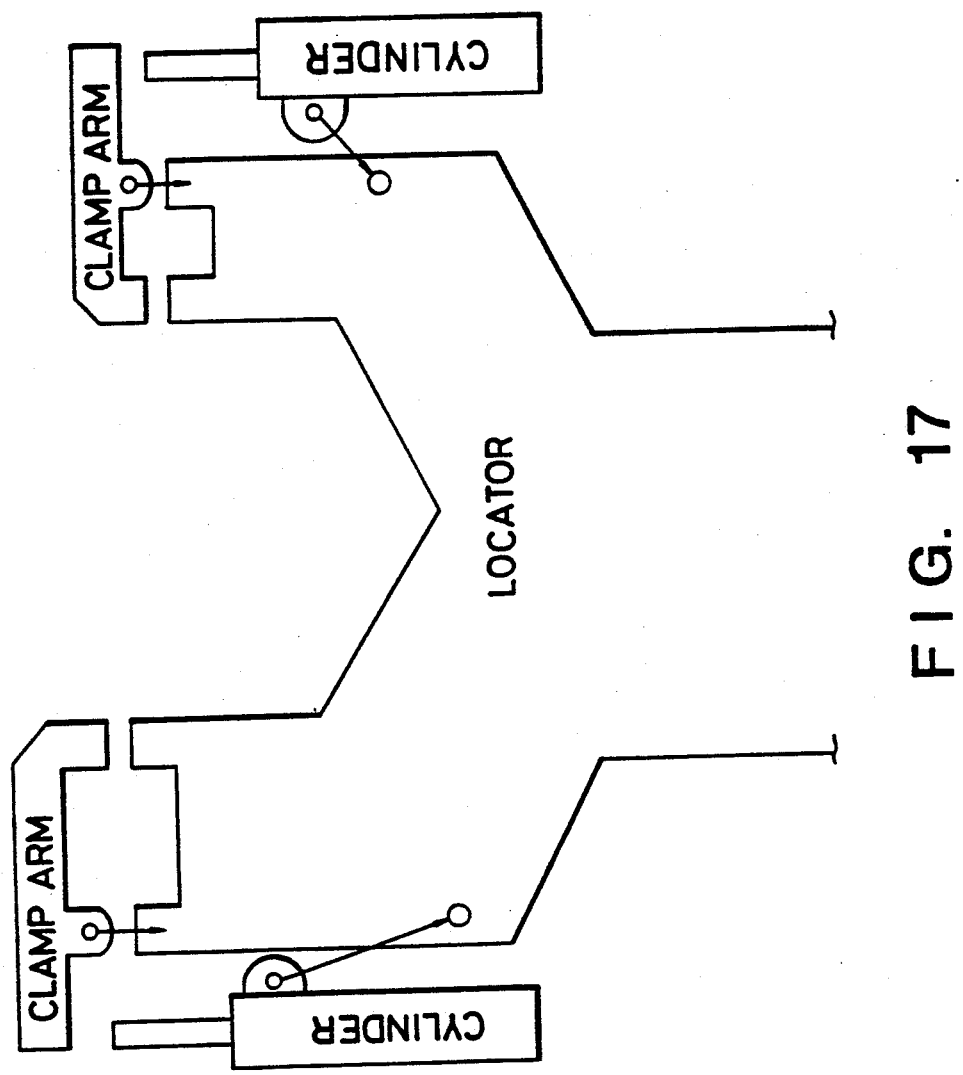
FIG. 17 is a drawing of another example of a clamp unit.

FIG. 17 is a front view of a clamp unit in which two cylinders and clamper arms are mounted on one locator. Although a basic linkage model for such a unit is different from that shown in FIG. 7, it is basically the same as that.

Effect of the Embodiment

The above-mentioned embodiment has the following effects:

(1) The structural models of parts which form a jig can be successively designed in linkage with each other on the assumption of the most basic design starting conditions for working positions of a workpiece which are contained in working basis data and basic linkage models which roughly show the components of the jig. Automatic design can be performed by simple operations with a high level of efficiency.

Since the basic mechanical structures of the components are contained in the basic linkage models, the designer may select only the design conditions, which are shown as a selection branch, in the process of design. The operator can also design a jig with a high level of design efficiency because the complicated calculations for calculating the design conditions are performed by the system.

(2): The best way is to select parts of a jig from the existing parts. However, it is not always impossible to select all the parts from the existing parts. Jigs used for the same purpose inevitably have different forms in correspondence with the conditions for use of the units. When a part is not present in the existing parts, therefore, the part must be created.

In this embodiment, the basic linkage models contain information with respect to the discrimination between the parts selected (the cylinder, the stand and the like) and the parts created (the clamp arm, the locator, the bed and the like) in the parts forming a jig. The structural models contain as output the selection conditions comprising the part specifications to which the existing parts conform and the creation conditions comprising the part specifications which must be satisfied by the parts having shapes to be newly created. Existing standard parts are selected from the selection conditions, and part shapes which the most agree with the selected parts in mechanical linkage therewith are created from the creation conditions.

In other words, the selection conditions and the creation conditions output as the structural models are a collection of part specifications. If various items of information such as correct information for part shapes, type numbers and makers of parts and so on are stored in the standard part database, therefore, it is possible to obtain all required information by searching the standard part database using as indexes the part specifications. For example, part tables can be easily output. (3): The above-described embodiment has as basic working data the shapes of the portions where the clamper cradle unit contacts directly with the workpiece. The shape of the surface of contact between the workpiece and the clamper arm of cradle unit is suitable for contact, resulting in the design of a jig with a high level of precision.

The present invention can be modified into various forms within the range of the gist of the invention, and thus the scope of the present invention includes modification, improvement, equivalents and so on. The present invention should be interpreted by the attached claims.

What is claimed is:

1. An automatic jig design apparatus for automatically designing a jig comprising at least oen part, said apparatus comprising:

linkage model generating means for generating a basic linkage model which basically shows the linkage between said at least one part;

input means for inputting data concerning a working position of a workpiece to be worked on by said jig; and structural model generating means for starting with the inputted data via the input means and successively generating structural models of said at least one part formign said jig in accordance with said basic linkage model.

2. An apparatus according ot claim 1, further comprising:

storage means for previously storing a plurality of basic linkage models;

setting means for setting allowable conditions for design of a jig;

comparison means for comaring a structural model of a part generated by said structural model generating means with said allowabel conditions;

retrieving means for retrieving other basic linkage models from said storage means on the basis of the results of comparison.

3. An apparatus according to claim 1, wherein the type of working by said jig is clamping, and said working position of said workpiece to be worked on is a contact surface clamped by said jig.

4. An apparatus according to claim 1, wherein said jig comprises movable components and non-movable components, said structural model generating means being started for designing said movable components.

5. An apparatus according to claim 1, wherein said linkage model generating means serves to store data with respect to said working position of said workpiece to be worked on by said jig in a database for each workpiece.

6. An apparatus according to claim 1, wherein said basic linkage model is prepared for each type of jig and workpiece.

7. An apparatus according to claim 1, wherein said structural model generating means further comprises:

data base means for storing a database of standard parts one of which can be selected as said at least one part; and means for searchign for a standard part in the data base means in accordance with the basic linkage model.

8. A method of automatically designing a jig comprising at least one part, said method comprising steps of:

specifying a type of jig and a type of workpiece to be worked on thereby;

searching for a basic linkage model which basically shows a linkage between said at least one part of the jig specified by using as keys said type of said jig and said type of said workpiece; and successively generating structural models of said at least one part forming said jig by using data with respect to a working position of said workpiece to be worked on by said jig in accordance with said basic linkage model searched for.

* * * * *

UNITED STATES PATENT AND TRADEMARK OFFICE
CERTIFICATE OF CORRECTION

PATENT NO. : 5,075,866

DATED : December 24, 1991

INVENTOR(S) : Sunao Goto et al.

It is certified that error appears in the above-identified patent and that said Letters Patent is hereby corrected as shown below:

column 1, line 29:
"sam" should be --same--;

column 2, line 47:
"jug" should be --jig--;

column 2, line 51:
"basis" should be --basic--;

column 3, line 60:
"PRINCIPEL" should be --PRINCIPLE--;

column 4, line 66:
"prooedure" should be --procedure--;

column 4, line 67:
"programmed." should be --programmed,--;

column 4, lines 67 and 68:
"on conditions and creation" should be deleted;

column 5, line 4:
after "conditions," delete "pl";

column 5, lines 65 and 66:
"workpiecse" should be --workpieces--;

column 6, line 7:
"ar eceiving" should be --a receiving--;

column 6, line 8:
"portion.1" should be --portion.--;

UNITED STATES PATENT AND TRADEMARK OFFICE
CERTIFICATE OF CORRECTION

PATENT NO. : 5,075,866

DATED : December 24, 1991

INVENTOR(S) : Sunao Goto et al.

It is certified that error appears in the above-identified patent and that said Letters Patent is hereby corrected as shown below:

column 9, line 18:
"That U is" should be --That is--;

column 10, line 6:
"xpressed" should be --expressed--;

column 10, line 9:
"Les" should be --Let--;

column 10, line 43:
"valeus" should be --values--;

column 10, line 62:
"B = y = P2y" should be --B = y - P2y--;

column 15, line 33:
"Operation Procedure" should be --Operating procedure--;

column 15, line 49:
"an" should be --and--;

column 16, line 23:
"ar" should be --are--;

column 16, line 45:
"recor" should be --record--;

column 19, claim 1, line 5:
"oen" should be --one--;

column 19, claim 1, line 17:
"formign" should be --forming--;

UNITED STATES PATENT AND TRADEMARK OFFICE
CERTIFICATE OF CORRECTION

PATENT NO. : 5,075,866

DATED : December 24, 1991

INVENTOR(S) : Sunao Goto et al.

It is certified that error appears in the above-identified patent and that said Letters Patent is hereby corrected as shown below:

column 19, claim 2, line 24:
"comaring" should be --comparing--;

column 19, claim 2, line 26:
"allowabel" should be --allowable--;

column 20, claim 7, line 18:
"searchign" should be --searching--;

Signed and Sealed this

Eighth Day of February, 1994

Attest:

BRUCE LEHMAN

Attesting Officer

Commissioner of Patents and Trademarks